United States Patent [19]

Borowski, Jr. et al.

[11] 3,784,981

[45] Jan. 8, 1974

[54] NORMALIZER FOR OPTICAL CHARACTER RECOGNITION SYSTEM

[75] Inventors: Chester Joseph Borowski, Jr., Garland; Dale Rodney Du Vall, Fort Worth, both of Tex.

[73] Assignee: Recognition Equipment Incorporated, Irving, Tex.

[22] Filed: July 28, 1971

[21] Appl. No.: 166,811

[52] U.S. Cl. .......... 340/146.3 H

[51] Int. Cl. .......... G06k 9/04

[58] Field of Search .......... 340/146.3, 146.3 H

[56] References Cited

UNITED STATES PATENTS

| | | | |
|---|---|---|---|
| 3,189,873 | 6/1965 | Rabinow | 340/146.3 H |
| 3,289,164 | 11/1966 | Rabinow | 340/146.3 H |
| 3,303,466 | 2/1967 | Holt | 340/146.3 MA |
| 3,196,398 | 7/1965 | Baskin | 340/146.3 H |
| 3,173,126 | 3/1965 | Rabinow et al. | 340/146.3 H |

*Primary Examiner*—Maynard R. Wilbur
*Assistant Examiner*—Joseph M. Thesz, Jr.
*Attorney*—Richards, Harris & Hubbard

[57] ABSTRACT

Signals produced by optically scanning different sizes and fonts of characters are normalized into a single format of data as an input to a character recognition unit. The signals are obtained by optically scanning characters with a single columnar retina and are used to produce a train of digital signals. Data derived from characters which are larger in size than a selected nominal are normalized by electronically weighting output signals from various photocells in the columnar array, summing the weighted signals and then averaging. The normalized output is delivered to a recognition unit to identify each character.

8 Claims, 37 Drawing Figures

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

PATENTED JAN 8 1974 3,784,981

SHEET 08 OF 20

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

INVENTORS:
CHESTER J. BOROWSKI, JR.
DALE R. DuVALL

Richards, Harris & Hubbard
ATTORNEYS

NORMALIZER FOR OPTICAL CHARACTER RECOGNITION SYSTEM

BACKGROUND OF THE INVENTION

1. Field of the Invention

The invention relates to optical character recognition systems, and more particularly, to an electronic system for normalizing data from an optical scanner to produce a standard signal format.

2. History of the Prior Art

In optical character recognition systems, it is highly desirable to include the capability of analyzing and recognizing characters of several different sizes and fonts. Normalization has been used in the past to insure that a signal pattern of information is delivered to a recognition unit for a given character, regardless of the size or font of the character. This permits a common recognition unit to be used for all different sizes of characters to be read. Some prior art systems have sought to normalize character input data by optically reducing the size of an image being scanned so that a single size image is always projected upon a scanning retina regardless of physical character size. Other systems have sought to produce a single format of signals by including a plurality of different sized retinas within the scanning unit so that a particular retina, scaled in proportion to the particular size and font of the character to be analyzed, can be selected and used.

Optical systems for reducing character image size are exceedingly complex and often unreliable because of the mechanical and optical problems encountered. Also, systems which employ multiple retinas are necessarily expensive because of the duplication of photocell facilities. The normalization system of the present invention overcomes the problems of prior art techniques by employing a single columnar retina and electronically processing the data produced by that retina so that a single size and format of character information is always presented to a recognition unit regardless of the size and font of the character being read.

SUMMARY OF THE INVENTION

In accordance with the invention, an optical character recognition system processes data from a columnar retina onto which characters of different heights are projected to cover a predetermined minimum or more cells. The system includes a gated output line leading from each cell, having an analog to digital converter to provide a digital output signal, and a cyclic means for sequentially gating the signals from the retina to the converter. A code is stored which represents a normalization factor capable of assuming any one of a plurality of values between one and two. Connected to the output of the converter is a means responsive to a normalization code greater than one for combining outputs of adjacent cells from a set greater in number than the minimum to provide outputs corresponding in number with the minimum.

BRIEF SUMMARY OF THE DRAWINGS

For a more complete understanding of the present invention and for further objects and advantages thereof, reference may now be had to the following description taken in conjunction with the accompanying drawings in which.

DETAILED DESCRIPTION

Figure 1:
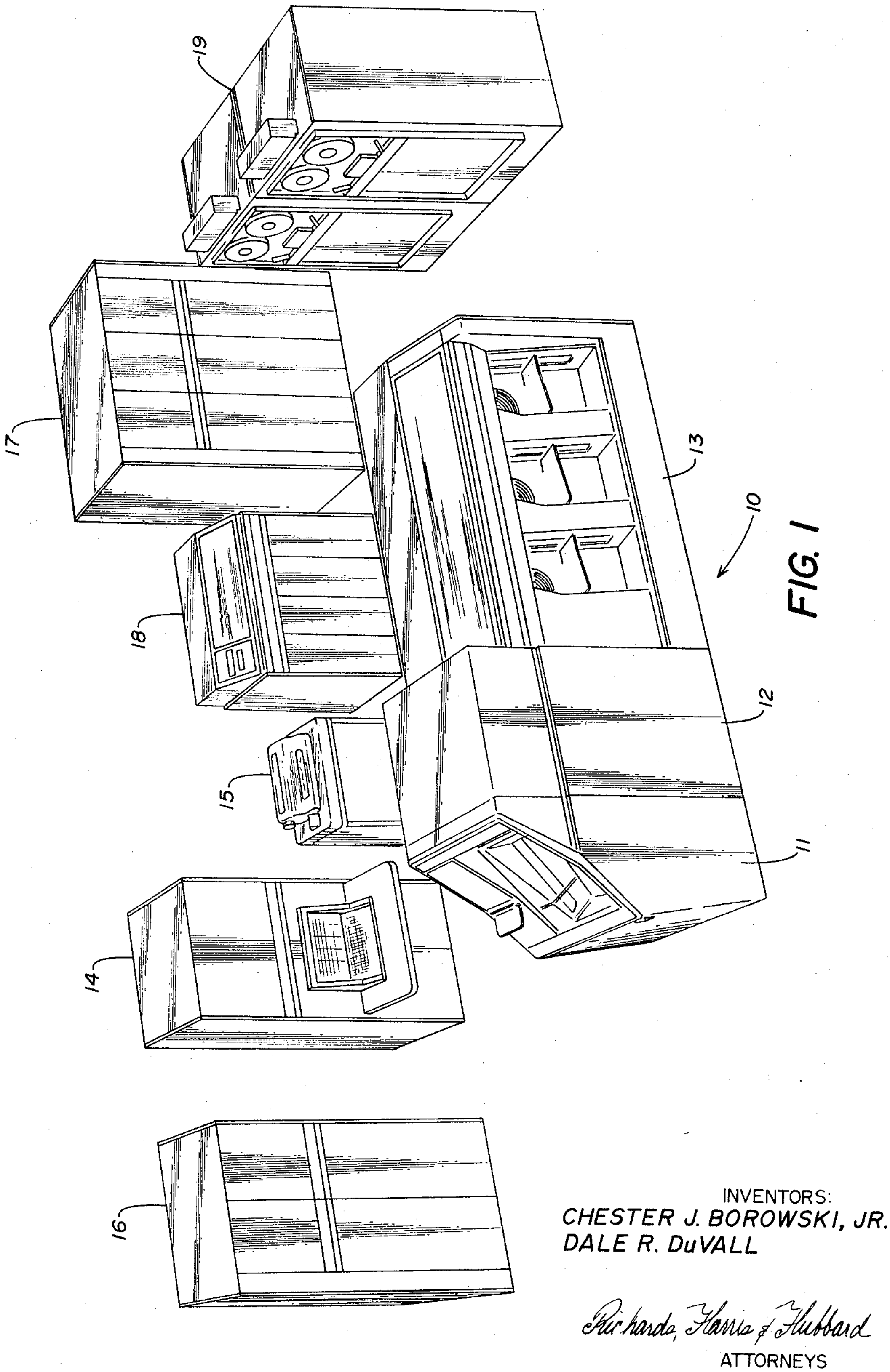
FIG. 1 is a layout of units of the system wherein the normalizer of the present invention is embodied.

The present normalizer system may be best understood by reference to its relation to a complete document reading system. Referring now to FIG. 1, a page processor 10 is employed for the feeding, scanning and stacking of documents. The page processor comprises a feeder unit 11, a transport scanning unit 12 including a normalizer to which the present invention is directed and a stacking unit 13. Peripheral equipment to the system comprises a control console 14, an I/O unit 15, a peripheral control unit 16, a recognition unit 17 which includes logic circuitry for the recognition of characters of fixed fonts as well as characters of handprint execution, a line printer 18 and a tape transport unit 19.

The system shown in FIG. 1 has the capability of accepting 9 × 14 inch documents with single spaced full coverage of the document. The system is capable of reading and completely transferring to storage, to line printer 18 or tape transport 19 all of the information on such documents at rates of the order of about thirty pages per minutes. On the other hand, credit card type documents, wherein the reading is to be accomplished on one or two lines only, can be processed by the present system at the rate of up to 300 cards per minutes. The system operates by placing into a hopper in feeder 11 a stack of documents to be read, feeding the documents one at a time into the tape transport and scanning unit 12, and then delivering the documents to the stacking unit 13 wherein the stacking can be selectively dependent upon any coded information on the documents themselves.

In order to provide an understanding of the setting in which the present invention finds itself and the desirability for the unique capabilities of the normalizer of the present invention, the line diagram of FIG. 2 will be described.

Figure 2:
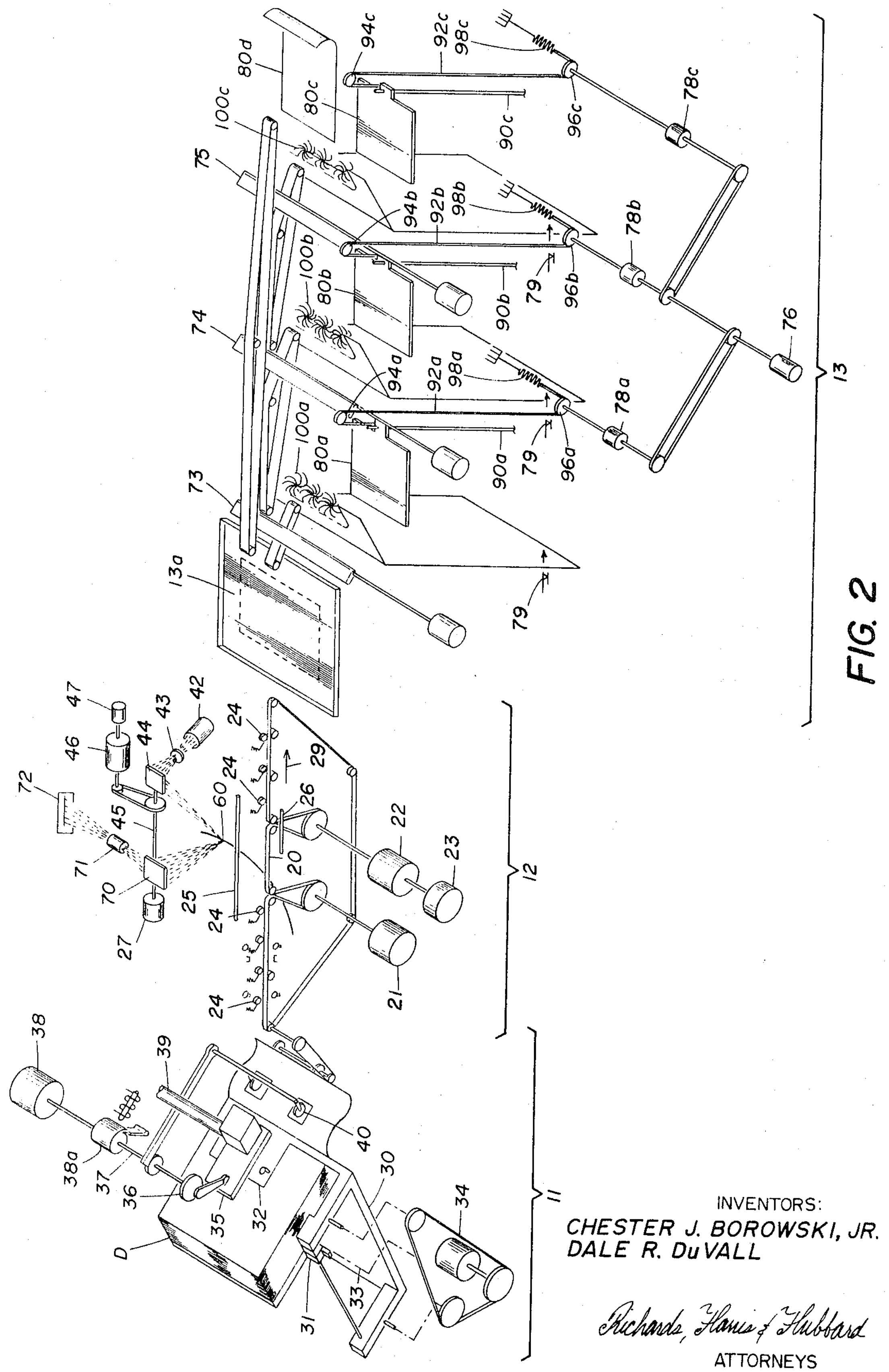
FIG. 2 is a diagrammatic representation of the mechanical portions of the page processor unit of FIG. 1.

Referring now to FIG. 2, a document feeder 11 has been illustrated as comprising a tray 30 in which a stack D of documents may be placed with the documents being oriented as to stand on the bottom edge thereof. A paddle 31 is slidably mounted to move the documents forward against a shuttleplate unit 32. The paddle 31 is linked schematically as by linkage 33 to a chain 34 which is servo driven to maintain the documents in a given density in the region of the face of the shuttleplate unit 32. A shuttleplate 35 is reciprocated through a crank unit 36 on a shaft 37 driven by a feeder motor 38 through a single revolution clutch 38*a*. The shuttleplate 35 has a plurality of apertures formed through it. A vacuum is maintained in the apertures through a vacuum system connected to an exhaust pipe 39. By this means, individual documents are sequentially removed from the stack D and are moved downwardly into engagement with a set of pinch rollers that are diagrammatically represented at 40.

The pinch rollers 40 direct each document into the document transport scanning unit 12 wherein the document is advanced by a belt 50 that is driven by a pair of servo motors 51 and 52 in response to a position encoder 53 and a suitable control system. Documents are maintained in contact with the belt 50 by a series of rollers 54 as well as by jets of air that are directed downwardly from parallel tubes 55 and 56 positioned above and on opposite sides of the belt 50. In the region of arc 60, the documents are drawn into a fixed position against a bedplate by a plurality of vacuum ports (not shown). Arc 60 represents the scan location of documents traveling under the action of the belt 50, and the arrow 59 represents the direction of travel of the documents.

At the scan location, light from a high intensity lamp 62 passes through a lens system 63 onto an oscillating mirror 64 and is projected and focused onto a scan point on arc 60. The mirror 64 is mounted on a shaft 65 that is driven by a servo motor 66 having a servo tachometer 67 associated therewith and an encoder 68 responsive to the movement of the shaft 65. A scanning mirror 70 is mounted on the shaft 65 for oscillation with the mirror 64. Light reflected from the mirror 70 passes through a lens system 71 onto a columnar retina 72. In one embodiment of the system, the retina 72 is provided with 96 active cells and is operated such that characters viewed by the retina as the light beam sweeps arc 60 actually fall on or energize 16 cells for a normal character, i.e., a character of usual type print height. The remainder of the cells of the retina are employed in the system for locating the next line line to be scanned and for providing control signals to the servo motors 51 and 52, whereby the document is properly positioned for the initiation of the scan of the next line.

Once scanned, each document is fed to a rest station 13*a* at the input of the stacker unit 13. The movement of the document is arrested at the rest station to permit the stacker unit to respond to control instructions. Then in accordance with such control instructions, the document is delivered, either to a selected one of three bins 80*a*, 80*b*, and 80*c*, or to a reject bin 80*d*. The movement of documents in the stacker unit 13 is under the control of stacker gates 81, 82 and 83, and spiral stacking wheels are employed to deliver documents to the selectable bins 80*a*, 80*b*, and 80*c*.

In order to accommodate documents of different weights, a positive control is provided through a stacker motor 86 operating through clutches 88*a*, 88*b*, and 88*c* to maintain the top of the stack of the documents on each of the paddles 80*a–c*, respectively, in a predetermined relation to the periphery of the spiral stacking wheels. In each bin, the document level is sensed by photocells to control the respective clutches 88*a–c*.

Within this environment, the document stacker 13 of the present invention is called upon to provide reliable feed and stacking of documents to the system in each of the many various conditions that may be prescribed by a user. The system of FIGS. 1 and 2 thus may operate in a wide variety of conditions and thus may be termed a universal document reader, being limited only by the maximum size of documents that can be accommodated in the document transport and stacking systems.

Photoelectric sensors 89, not shown, are disposed adjacent the paddles 80*a–c* and control the operation of the stacker motor 86. The paddles 80*a–c* are respectively slidably mounted upon shafts 90*a–c* and are moved along the shafts 90*a–c* by operation of suitable belts or chains 92*a–c*. Chains 92*a–c* are reaved over pulleys 94*a–c* and 96*a–c*. Each of the chains 92*a–c* is respectively coupled through negators spring 98*a–c*, with the end of each of the constant force springs being connected to a rigid frame. Operation of the stacker motor 86 may then move the chains 92*a–c* to move the paddles 80*a–c* vertically along the shafts 90*a–c*, in order to maintain the stack of documents thereon in a predetermined relationship to stacking wheels **100*a–c*. Wheels 100*a–c* serve to decelerate and stack documents fed from the rest station 13*a***. For further description of the control of deflecting blades for selective stacking of documents with a plurality of pockets, reference is made to U.S. Pat. No. 3,460,673, issued on Aug. 12, 1969, to the present assignee.

Within this environment, the normalizer of the present invention is called upon to provide reliable normalization of scanned character data from documents fed to the system in each of the many various conditions that may be prescribed by a user. The system of FIGS. 1 and 2 thus may operate in a wide variety of conditions and thus may be termed a universal document reader, being limited only by the maximum size of documents that can be accommodated in the document transport and stacking systems.

The optical character recognition system which incorporates the normalizer of the present invention includes a multi-front page reader which has the capability of reading and recognizing characters having a wide variation of sizes and fonts. The individual character size found in printed matter may vary in height but it may be assumed that the aspect ratio, that is the proportion of height to width, remains constant. Further, the actual style and configuration of individual characters may change markedly depending upon the particular type font used. Character size and font variations present a critical requirement for optical character readers to be capable of handling and optically processing characters of various style. The optical character recognition system within which the normalizer of the present invention is found, is capable of reading the font sizes and styles set forth in Table I.

TABLE I

| Font Styles | Nominal Character Size (In.) | Number of Characters | Pitch | Character Types (Alpha, Numeric, Specials) |
|---|---|---|---|---|
| 1403 Standard | 0.112 | 51 | 10 | A,N,S |
| x03 (1403 Modified) | 0.112 | 51 | 10 | A,N,S |
| ASA (OCR-A, Size A) | 0.112 | 51 | 10 | A,N,S |
| ISO (OCR-B, Size I) | 0.112 | 56 | 10 | A,N,S |
| 1428 OCR | 0.112 | 44 | 10 | A,N,S |
| ANELEX | 0.112 | 48 | 10 | A,N,S |
| 1403 Standard Numeric | 0.112 | 14 | 10 | N,S |
| ASA (OCR-A,A) Numeric | 0.112 | 10 | 10 | N |
| ISO (OCR-B,I) Numeric | 0.112 | 10 | 10 | N |
| 3/16 Gothic | 0.196 | 10 | 7 | N |
| E13B | 0.126 | 14 | 8 | N,S |
| 407E-1 | 0.126 | 12 | 9 | N,S |
| 1428E | 0.154 | 19 | 7 | A,N,S |
| 7B | 0.182 | 18 | 7 | A,N |

It should be noted that the nominal character heights vary from 0.112 inches to 0.196 inches. The present optical character reader is capable of recognizing characters whose heights vary from 0.112 inches to 0.224 inches, that is, over a range with limits having a ratio of 2 : 1.

When it is desired to read characters over a substantially wide range of character sizes, it is necessary either to have recognition units capable of responding to data of a wide range of heights or to reduce the apparent size of the electrical representation of the character image transmitted to the recognition equipment. Certain prior art character reading systems have employed the optical technique of changing the magnification of the character detection unit in response to the size of the character being read so that a consistent size character is always projected onto the unit which reduces the optical image to electronic data. Another technique for producing the capability of handling characters of varying sizes has been to provide a plurality of optical sensors which are scaled in proportion to the size of the character to be read. Output information is selected from the optical sensor which has the proper size ratio to that of the print being read. This method, of course, results in a substantial expense in duplicate optical sensing equipment.

Figures 3, 4:
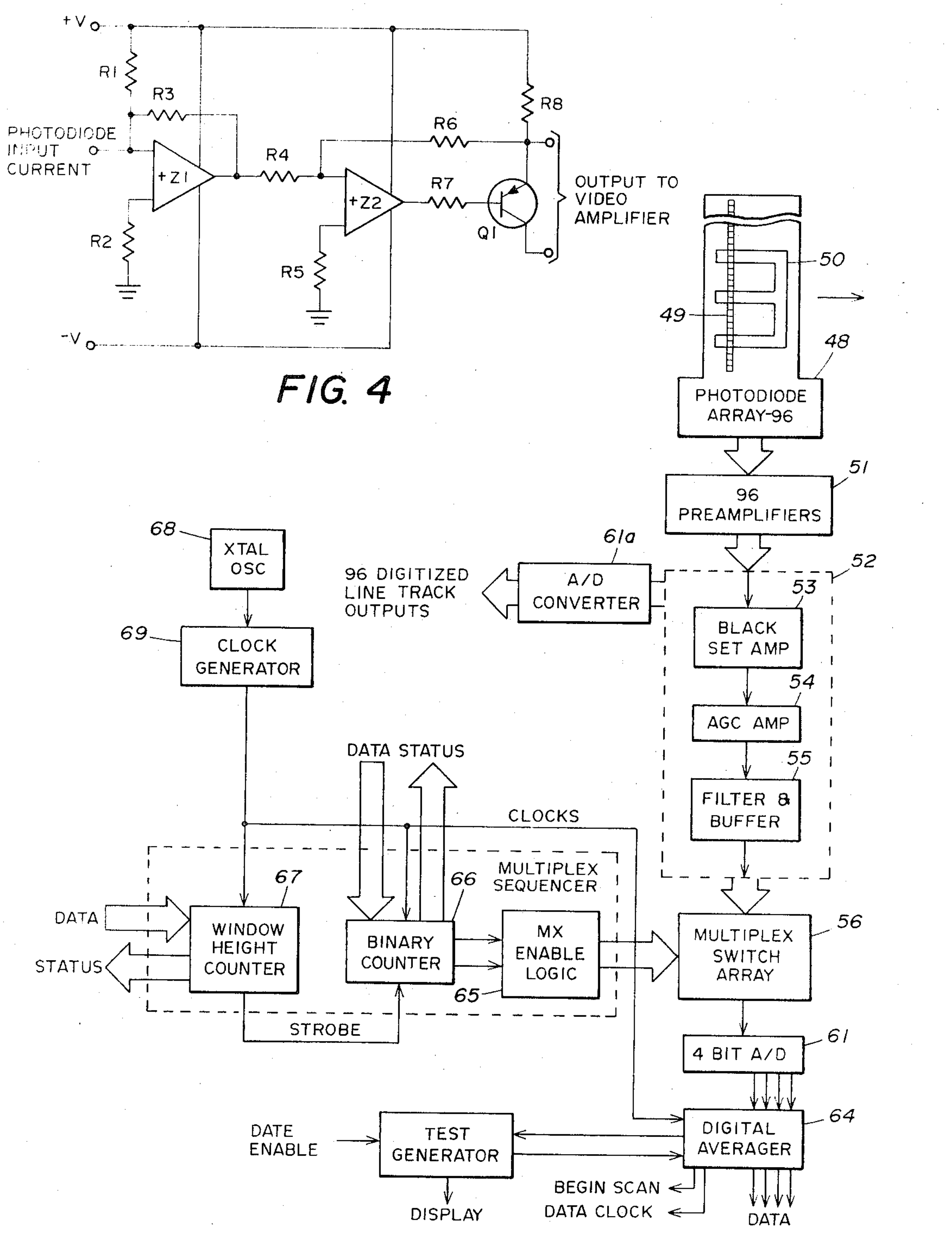
FIG. 3 is a block diagram of the circuitry employed to process the data received from the retina of the present optical character recognition system.
FIG. 4 is a schematic diagram of the retina photocell current preamplifier.

Referring to FIG. 3, this embodiment of the optical character reader of the present invention includes an input section which comprises a retina unit 48 having a single column array 49 comprised of 96 photocells. The output of the photocells is applied by way of a set 51 of preamplifiers, one preamplifier for each cell, to a corresponding set of video amplifiers 52. Each video amplifier includes a black set amplifier 53, an AGC amplifier 54 and a filter and buffer unit 55. The output of each video amplifier 52 is then applied to a multiplex switch array 56 which in turn feeds a four bit A/D converter 61 whose output is then applied to a digital averager 64. The 96 line track output signals are also applied by way of an A/D converter **61*a*** to produce 96 digitized line track output signals.

The multiplex switch array 56 is controlled by a multiplex enable logic unit 65 which in turn is controlled by a binary counter 66. The binary counter 66 is controlled by a window height counter 67 which is energized by way of a crystal oscillator 68 and a clock generator 69.

In operation an image 50 of successive characters is projected by a scanner system (not shown) onto the photodiode retina 49. Retina 49 is a linear monolythic array of silicon photodiodes consisting of 96 elements placed in a column. In one embodiment each element had an active area on the order of 0.014 inches wide by 0.012 inches high. The elements are spaced from one another a distance on the order of 0.014 inches center to center.

When an image 50 of a character to be recognized passes across the column of photocells 49, a portion of the character height extends in a direction from top to bottom of the columnar array and exposes only a fraction of the number of cells in the array. The outputs of the cells in the array are scanned from bottom to top at such a rate that a vertical section of a character of 0.007 inches wide is sampled three times before it completes its traverse across the array. Obviously a character having a nominal height of 0.112 inches will only cover half the number of photocells as the same character having a height of 0.224 inches. With the data gathered from the smaller character by scanning the photocell outputs different from the data gathered from a larger identical character, compensation is provided so that identical sets of data are ultimately produced for different sizes of a character. The normalizer, FIG. 3, to which the present invention is directed, performs such a function.

As above noted the photodiodes 49 in retina 48 are individually connected to 96 preamplifiers 51 shown in FIG. 4. The preamplifiers 51 provide current gain for signals from the photocells 49 and act as high impedence current sources for video amplifiers 52.

As shown in FIG. 4, each preamplifier comprises a pair of series connected amplifiers Z1 and Z2. The output of amplifier Z2 is coupled through a transistor Q1 which operates in the common collector configuration. The circuitry of FIG. 4 comprises a hybrid package type 165-572-0 manufactured by The Beckman Instrument Co. of Fullerton, California. Z is a transresistance amplifier, while Z2 is a transconductance amplifier. The resistor values used are: R1 = Z megohms, 2 percent; R2 = 2.2K ohms, 20 percent; R3 = 51 K ohms, 1 percent; R4 = 120 ohms, 1 percent; R5 = 120 ohms, 20 percent; R6 = 220 ohms, 1 percent; R7 = 100 ohms, 20 percent and R8 = 3.63 K ohms, 1 percent. The transistor Q1 is a type 2N2605.

Figure 5:
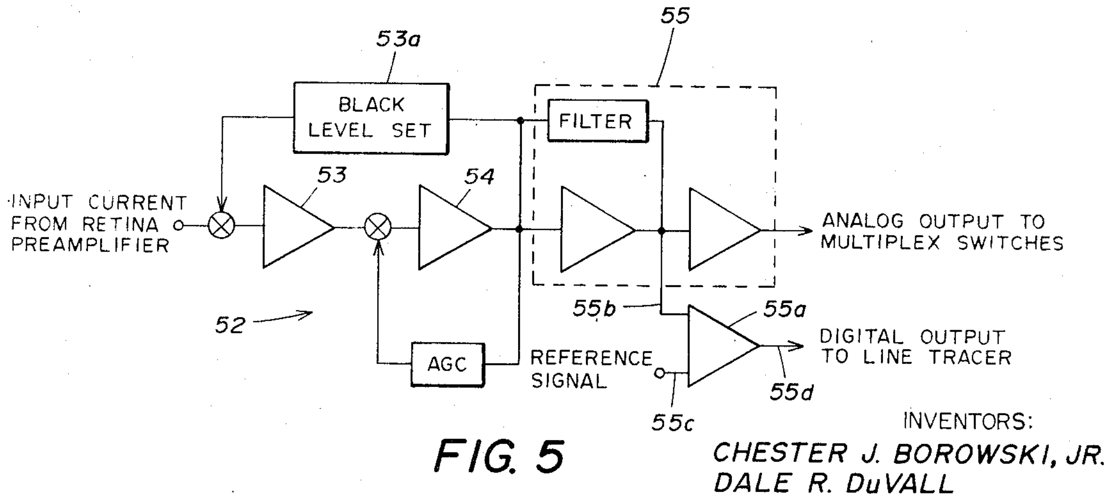
FIG. 5 is a schematic diagram of the retina video amplifier circuit.

The video amplifiers 52 of FIG. 5 convert the amplified photocell currents from the retina preamplifiers 51 to analog voltage signals that vary from 0 to 5 volts. Automatic gain control is used to set the gain of the amplifiers 52 such that the highest output of each photocell in the array 49 is transformed to 5 volts at each amplifier 52 output when a given photocell views a white area. Thus, the retina amplifiers 52 equalize background levels and help make the characters stand out on a white background. A black level set unit 53 is provided to null the lowest light level current from the photocells 49 to a zero (0) volt output. The retina amplifiers 52 provide an output to the A/D converter **61*a*** for use by line tracking circuitry to be described.

As shown in FIG. 5, each of the retina amplifiers 52 includes a black level set amplifier 53 which compensates for the photocell lowest light level current by means of a black level set feedback control **53*a*. Amplifier 53 converts the input current due to a black reference image to an output of approximately zero (0) volts in less than 2 milliseconds and holds that preset value for approximately 40 milliseconds after the input ceases. Once the black level has been set for each photodiode output, each signal then passes through a white level set and automatic gain control amplifier 54 which is used to establish a maximum voltage level of 5.0 volts for the highest output current level from the photodiode. The signal then passes through filtering and buffering circuitry 55 to the multiplex switches 56** which perform the sampling function.

The outputs from the 96 photocell elements of the retina 49 each individually amplified, are also digitized by a differential comparator **55*a*. A video analog voltage on line 55*b* greater than the reference signal of 3.5 volts on line 55*c* produces a white logic level on line 55*d*. A voltage less than 3.5 volts produces a black logic level on line 55*d*. The line 55*d* is connected to line tracking circuitry which monitors the photocells being stimulated by a character and transmits the information to the process controller which controls the window position being scanned by the multiplexer 56**.

Figure 7:
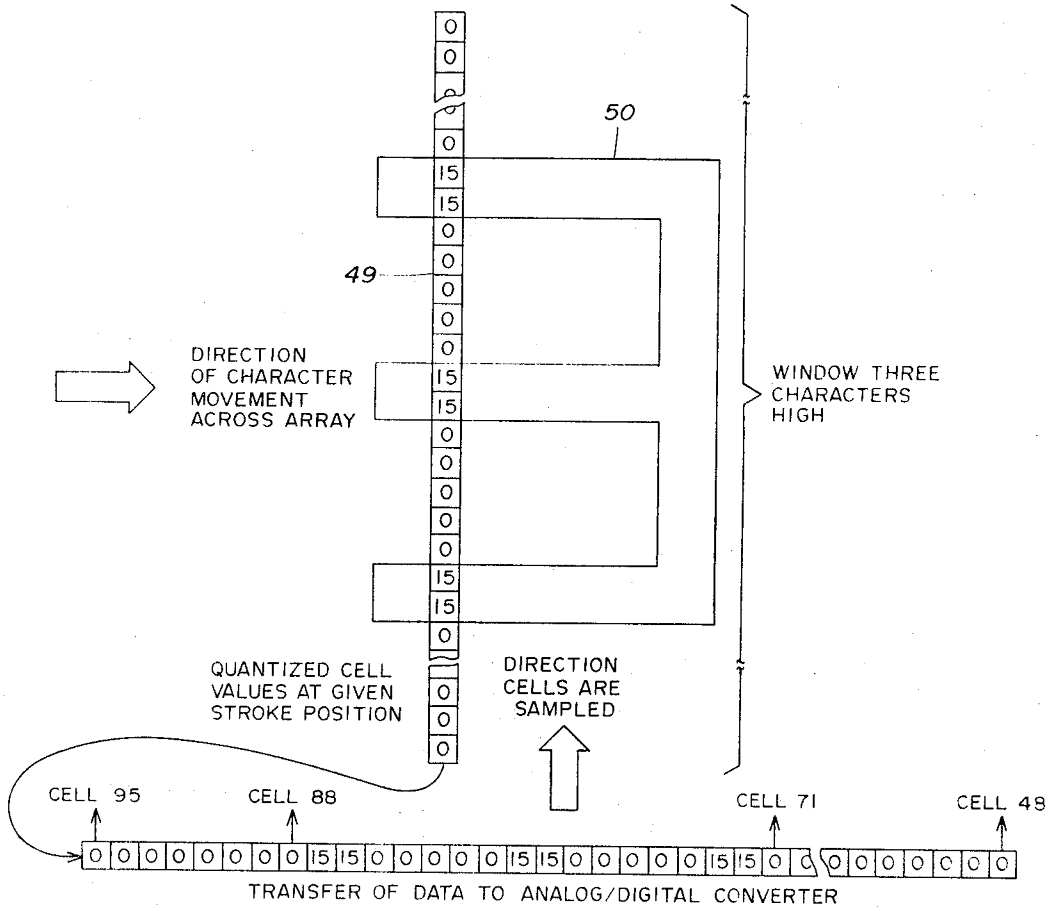
FIG. 7 is an illustration of the manner in which character image data is scanned and sampled from the retina photocells and serially transmitted for further processing.

As shown in FIG. 3 the amplified output of each of the photocell elements of the columnar retina 49 passes into a multiplex switch array 56 whose function is shown in FIG. 7. The function is to sample the amplified analog voltages from the columnar photocell array and produce a serial stream of data corresponding to a vertical scan through the character space. The sample period of the multiplex switches is set to obtain 36 scans per character when reading at 300 document in/sec.

Three character heights are sampled to allow for character misregistration. The number of vertical samples will vary from 48 for a nominal 0.112 inch character to 96 for a 2 : 1 0.224 inch character. However, the data output will always be related to a 48 equivalent cell window height and a 16 cell character height. FIG. 7 illustrates the manner in which light/dark information from a character image is sampled by the multiplexer and passed to the analog/digital converter.

The maximum number of switches to be sampled by the multiplexer are 96. The number of cells scanned is determined by the normalization ratio which is supplied by the process controller, a high speed digital computer, and depends upon the size of the characters being processed. The starting point of the scan is determined by a present window bottom value, which is also under control of process controller and determined by the output of the line tracker. The multiplex switches are arranged in decks 57 FIG. 6 of 16 switches each to keep the capacitance on the common bus at a minimum. Each deck 57 is fed to a buffer amplifier 58 which in turn drives an analog OR circuit 59. Circuit 59 follows the highest analog input. The analog data is clocked into an analog/digital converter 61 at the multiplex clock rate through a level shifter 62. Holding circuitry is not required because the sample times are so small.

Referring again to FIG. 3, window bottom present codes are supplied to the counter 66 by the process controller and are represented by 6 bits. For a normal character height of 16 photocells (a normalization ratio of 1:1), three character heights or 48 cells are scanned. When the largest character is present (a normalization ratio of 2 : 1), the character height is 32 cells and a 96 cell window will be scanned. The window bottom preset codes, which are stored in the counter 66, select the first cell to be sampled by the multiplexer. The internal window height counter 67 controls the height of the window to be sampled. The mutliplex switch array 56 connects the serial stream of amplified video data from the photocells to the analog/digital converter 61 which converts each one of the analog voltage levels from the respective photodiode outputs to a 4 bit digital representation of that level. A completely black cell is represented by the digital word 0000 while a completely white cell is represented by the digital word 1111. The digital signals are then coupled to the input of a digital averager 64 for further processing.

Optical magnification in the scanner is set so that a 0.112 inch character will cover 16 vertical photocell units on the columnar array. A character is represented by a 16 unit high by 12 unit wide mosaic. Other desired magnification ratios are artificially produced by electronically reducing the size of the image that falls on the columnar array. The reduction is done in two dimensions so that the image is not distorted. The columnar retina 49 responds only to vertical slices of the character at a given instant of time. Therefore, the horizontal dimension of a character is created by the number of horizontally spaced slices occupied by a character. In order for the rest of the components of the system to be invariant when the apparent magnification ratio is changed, the number of scans per character space must remain constant.

The number of scans per character space will remain constant if the vertical scan rate is constant with respect to magnfication ratio changes and different size characters have the same aspect ratio. It is to be understood that the aspect ratio does vary but the range of variation for the fonts to be read by the system is small and a constant aspect ratio may be accurately assumed.

Figure 8C:
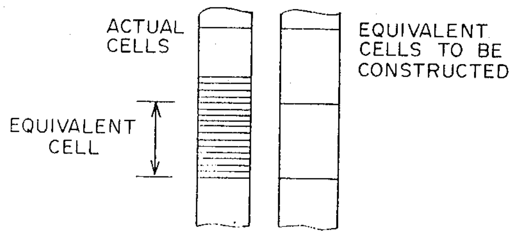
FIGS. 8A, 8B, 8C and 8D are illustrations of the purpose and function of a normalizer constructed in accordance with the invention.
Figure 8A:
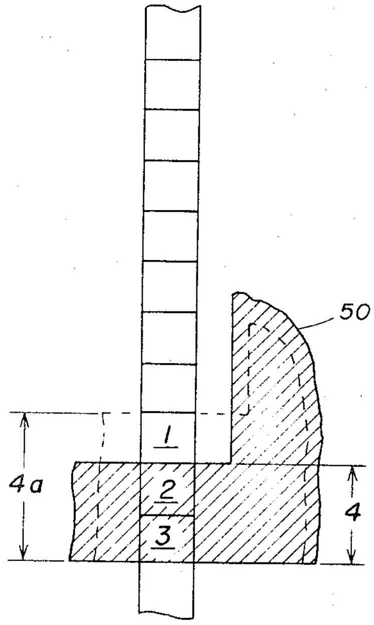
Figure 8B:
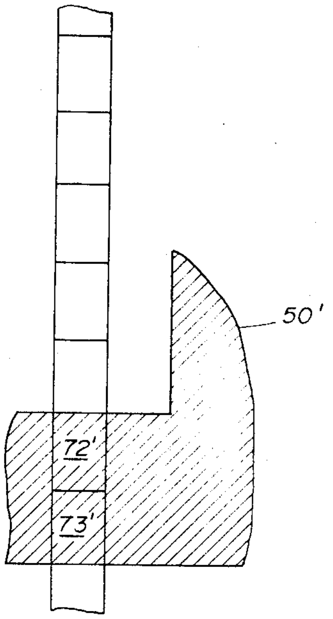

A standard normalized output signal is provided regardless of the size of the particular character being projected on the columnar retina. In FIG. 8A, a portion of character 50 is shown as it overlies and passes across the section of retina 49. Black output signals from cells 72 and 73 will be produced each time retina 49 is scanned. White output signals will be produced by cell 71. If the same character, but 1.5 times larger passes across the retina 49, FIG. 8A, photocells 71–73 will all produce black output signals. This is because stroke 74a is 1.5 times the height of stroke 74. The larger character produces a different pattern of output signals from the photocells as they are scanned. In order to produce the same output signals pattern for delivery to a recognition unit, it would be necessary to use a retina having photocells scaled 1.5 times as high as those in the retina of FIG. 8A. If such a larger retina were used, as shown in FIG. 8B, the same number of cells would be covered by the character image. Because of the difficulty and expense of providing a plurality of columnar retinas to be selectively used for various sizes of characters, electronic normalization is employed.

HORIZONTAL NORMALIZATION

Character images pass across the columnar retina 49 at a constant rate regardless of the size of the character being scanned. The rate at which the columnar retina 49 is scanned by the multiplex switches is also a constant value. As discussed above, the scan "window" varies with the size of the character. Since the photocell outputs are sampled at a constant rate, it takes longer to gather the data for a complete vertical scan of the window because more photocell outputs must be examined before the entire character "slice" has been sampled. For example, it takes half as long to sample the window for a character of a nominal size of 0.112 in. as it does to scan the window of a character twice that size. The vertical window scan time automatically compensates for horizontal changes in size of the character. The aspect ratio or proportion of height to width of characters being scanned is assumed to be relatively constant, i.e. a ratio of 4:3, regardless of the absolute dimension.

VERTICAL NORMALIZATION

In order to normalize character information vertically it is assumed that each photocell comprising retina 49 is made up of a number of individual segments or slices. The assumed segments effectively are divided up, weighted and averaged to construct "equivalent cells." The equivalent cell values then correspond with values that would have been produced by a larger scaled retina. As shown in FIG. 8C, each photocell is assumed to comprise eight individual segments.

Table II relates character sizes to a normalization ratio which has a range of from 1:1 to 2:1 with eight steps therebetween. Normalization factors and averaging factors for the various size characters are also given in Table II.

TABLE II

| Normalization Ratio | Character Size Inches | Normalization Factor | Averaging Factor |
|---|---|---|---|
| 1:1 | 0.112 nominal | 16/16 | 8 |
| 1 1/8:1 | 0.126 | 16/18 | 9 |
| 1 1/4:1 | 0.140 | 16/20 | 10 |
| 1 3/8:1 | 0.154 | 16/22 | 11 |
| 1 1/2:1 | 0.168 | 16/24 | 12 |
| 1 5/8:1 | 0.182 | 16/26 | 13 |
| 1 3/4:1 | 0.196 | 16/28 | 14 |
| 1 7/8:1 | 0.210 | 16/30 | 15 |
| 2:1 | 0.224 | 16/32 | 16 |

Figure 8D:
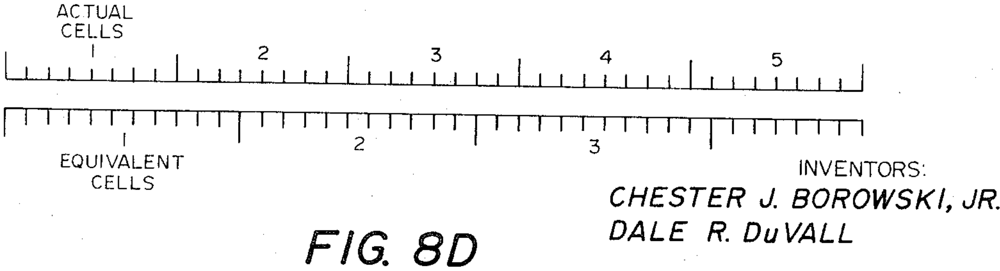

When characters of a given size and normalization ratio are to be read, the process controller is preset to supply the proper averaging factor to the normalizer. The normalizer then processes the actual digital cell values to weight and averages them into normalized equivalent cells. By way of example, and referring to FIG. 8D as an illustration, equivalent cells are constructed for a character having a normalization ratio of 1 3/8 : 1. For this ratio the averaging factor is 11. At the beginning of the scan the first cell presented to the digital average provides 8 of the 11 segments required to make the first equivalent cell. The second cell provides the remaining 3 segments of the required 11 which are combined with the 8 segments from the first cell to complete the first equivalent cell. The remaining 5 segments from the second cell are used to contribute to the second equivalent cell. The third cell provides 6 segments to complete the second equivalent cell. The remaining 2 segments are used for the third equivalent cell. The fourth cell provides 8 segments for the third equivalent cell with one additional segment being required. The fifth cell provides the 1 additional segment to complete the third equivalent cell. The remaining 7 segments from the fifth cell contribute to the fourth equivalent cell. In this manner, the cell data are used to construct the equivalent cells. For different averaging factors, the number of required segments to construct an equivalent cell differs but the recombination techniques are the same in each case.

Since the actual cell output does not consist of 8 individual pieces, the process of averaging and normalization includes the steps of: (a) weighting each one of the outputs with a factor equivalent to the number of desired segments of the cell to be used; (b) summing the weighted segments; and (c) dividing by the total number of segments employed to produce a complete normalized equivalent cell.

Normalization is performed by the digital averager 64 of FIG. 3. The output of the multiplexer 56 is a serial train of analog step functions representing the values of the video information of from 48 to 96 cells depending upon the preassigned normalization ratios. The video signal from each sampled cell is digitized into four bit binary words or bytes by the analog/digital converter 61. The digital averager 64 provides a means of programmable mathematical averaging for incoming binary data bytes.

The averager 64 is constructed with emitter coupled logic to obtain high data rates on the order of a 160 nanoseconds. A pipeline mathematical operation is performed on the data through partial mathematical calculations over a period of four data cycles. There is a 640 to 800 nanosecond delay between data input and quotient output; however, this does not alter the 160 nanosecond input rate, since the data is still moved through the unit at the input rate.

The averaging technique used for normalization is to assume a constant which is used in determining the number of equal portions of which the incoming data is to consist. In the present system, the constant eight is used. That is, the incoming data is considered as eight separate data bytes, each equivalent to the binary value expressed in the data input code. Since the number eight has been selected as a constant, the unit will perform averaging operations based on ⅛ slices of incoming binary data. The data bytes represent the information from each of the photocells in the columnar array. If the restrictions mentioned are used, the averaging operations are applied to no less than one full data input, which is eight one eighth character binary portions.

The general theory of operation of the digital averager is as follows. A binary number, called the averaging factor which is used to determine the number of ⅛ binary portions to be averaged, is set in the device. The averaging factor, as discussed above, is a function of the size of the character to be read and is supplied by the process control computer. In the present system the averaging factor has been restricted to binary numbers eight through sixteen. For an averaging factor of nine, the data train will be divided into groups of nine ⅛ binary portions and then averaged.

By way of illustration of the general function of the digital averager, assume that the averaging factor of 9 is used and that a data train consisting alternately of binary sixteens and eights comprise the input data. This would mean that the first data group would consist of eight portions valued at binary sixteen and one portion valued at binary eight. When averaged, the binary equivalent is 16(8) + 8(1)/9 or binary 15.

The second group would consist of seven portions valued at binary eight and two portions valued at binary 16. When averaged, this group equals 8(7) + 16(2)/9 or binary 10.

The third group would consist of six portions valued at binary 16 and three portions valued at binary 8. When averaged, this group equals 16(6) + 8(3)/9 or binary 13.

The fourth group would consist of five portions valued at binary 8 and four portions valued at binary 16. When averaged, this group equals 8(5) + 16(4)/9 or binary 12.

This process of averaging is continued until all input data has been averaged or until the cycle is restarted by means of a begin cycle strobe pulse input. The output format of data from the averagee is in the form of a 4 bit binary code which is the quotient result of the averaging division operation.

In order to change the averaging divisor, the averaging factor is change or reset by the process controller. Changes are synchronized with the last data input to be averaged at the previously used averaging factor to eliminate errors due to code change occurrence.

To accomplish the above illustrated weighting and averaging operations, a system capable of tracking the porportional values assigned to each data input is necessary. This functions by means of subtraction and updating. That is, a subtraction is performed between a tracking unit and the averaging factor. The tracking unit is updated with each data input until the averaging factor is satisfied. At this time, the tracking unit is recycled for the next data group. Since the data is restricted to eight equal portions, no individual data input number can contribute more than eight parts of the overall data group to be averaged.

Once the proportional contribution is determined for a given data input, this data is multiplied by the proportion number which was determined. The product is then stored in a buffer unit which is used to sum all of the portions within a given data group. The sums are then fed to a binary divider network which divides the product sums by the averaging factor. The quotient output then represents the final averaged data value, which is the value of the normalized equivalent cells sent to the recognition unit for identification of the character being read.

Figure 6:
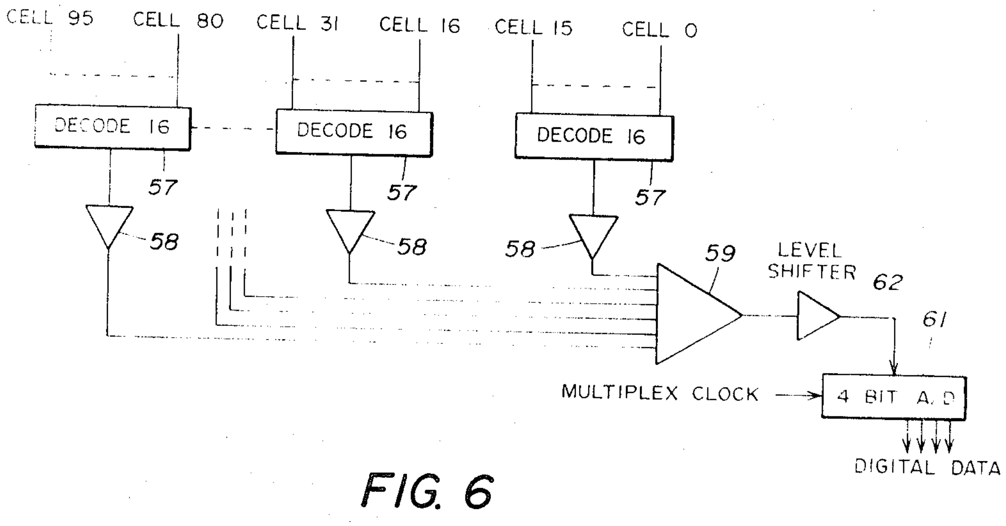
FIG. 6 is a schematic diagram of the retina photocell multiplexing circuit.

The input to the digital averager is a serial stream of four bit binary words from the analog/digital converter 61, FIGS. 3 and 6. Each word represents the output of a photocell in the columnar retina 49 as sampled during scanning.

Figure 9:
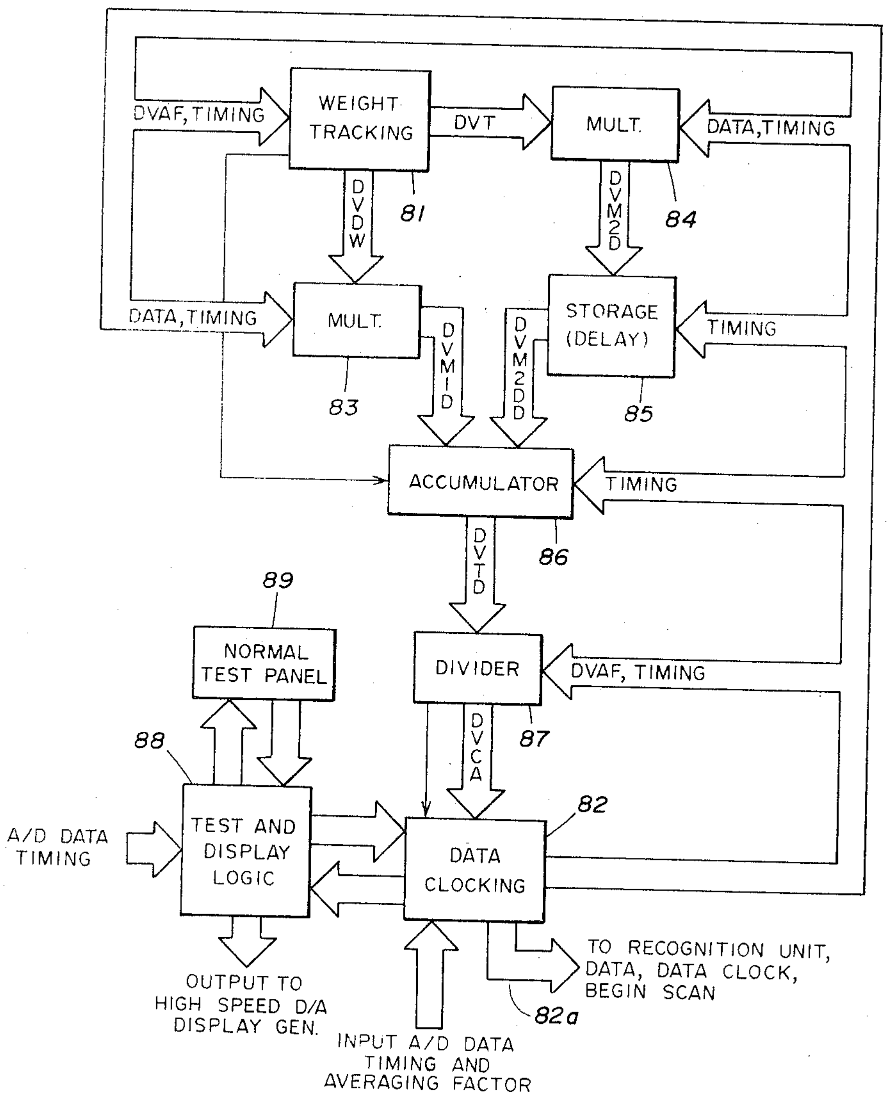
FIG. 9 is a block diagram of the digital averager circuitry included within the normalizer of the present invention.

The data is processed by the digital averager shown in the block diagram of FIG. 9. The symbols used in FIG. 9 represent particular signals which are passed through the channels shown between the various units and are defined in Table III as follows:

TABLE III

DVAF — Averaging factor value used to construct equivalent cells

TIMING — System synchronizing signals including three clock pulses of different phase and a begin scan signal DVD — Multiplication factor used in multiplier 83

DATA — Unnormalized digital character information

DVT — Multiplication factor used in multiplier 84

DVDW — Number of segments of current actual cell required to construct current equivalent cell DVMZD — Product of multiplication factor and data formed in multiplier 84

DVMID — Product of multiplication factor and data formed in multiplier 84

DVMZDD — Delayed value of DVMZD

DVTD — Accumulated multiplied data from both multipliers 83 and 84.

As shown in FIG. 9, weight tracking unit 81 receives administrative information from the process control computer (not shown) and timing signals from a data clocking unit 82. The weight tracker 81 generates control signals to operate the other units of the digital averager. Cell data from the analog/digital converter is fed into both multiplier 83 and multiplier 84 together with control signals generated by the weight tracker 81. The weighted cell value from multiplier 84 is delayed by a storage circuit 85 and then added to the output from multiplier 83 in an accumulator 86. The weighted sum of the cell data from the accumulator 86 is fed to a divider 87 which averages the sum to produce a normalized equivalent cell value. The normalized cell values are then fed to the recognition unit, RV, (not shown in FIG. 9) by the data clocking circuitry 82, through channel 82*a*.

The digital averager incorporates test facilities in the form of test and display logic circuitry 88 which supplies test word data to the normalizer and then displays the processed result for analysis. Tests are performed under control of an operator by means of a normalizer test panel 89.

Logic circuitry comprising the digital averager supplies five basic circuit functions to accomplish normalization by producing equivalent cells.

Having described the general functional operations of the digital averager, the specific circuits used to implement these operations will be discussed.

WEIGHT TRACKING CIRCUIT

Figure 10:
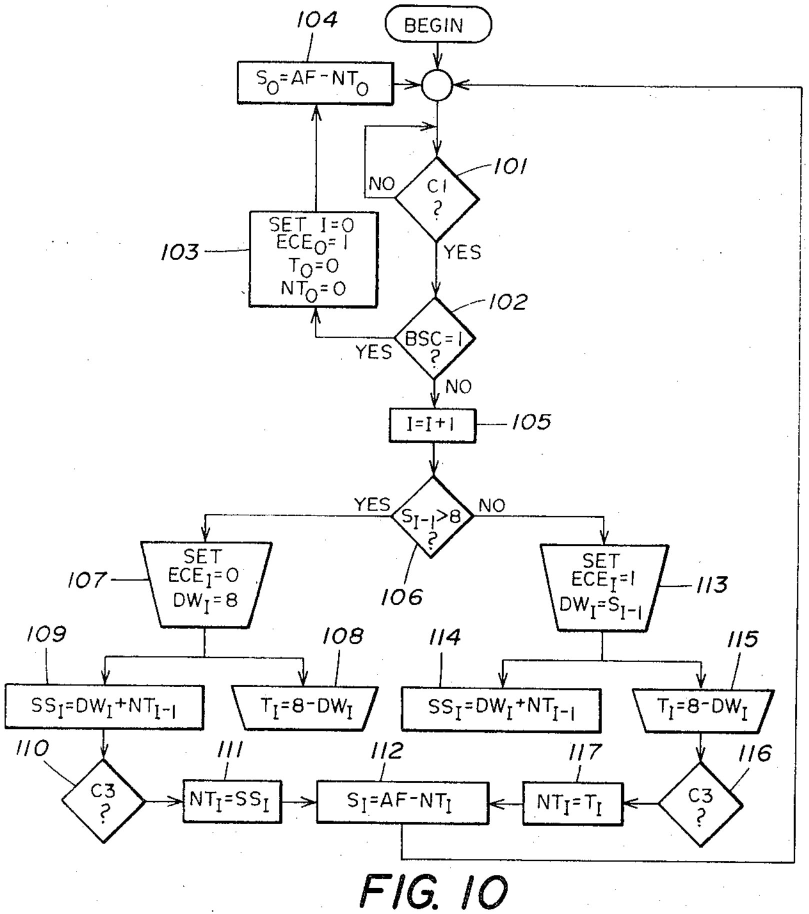
FIG. 10 is a flow diagram showing the functions of the weight tracking circuitry included within the digital averager of FIG. 9.

FIG. 10 is a flow chart for the weight tracking circuit. The following nomenclature is used:

1. NT is the value of the register which keeps track of the number of segments which have already been used to construct the current equivalent cell;
2. BSC is a begin scan signal which provides a reset to the weight tracking circuitry to make sure that it begins each scan in the correct timing sequence;
3. S and SS are two different outputs of the adder circuit which are time shared; and
4. AF is a five bit averaging factor which is supplied to the weight tracker from the process controller.

Figure 11:
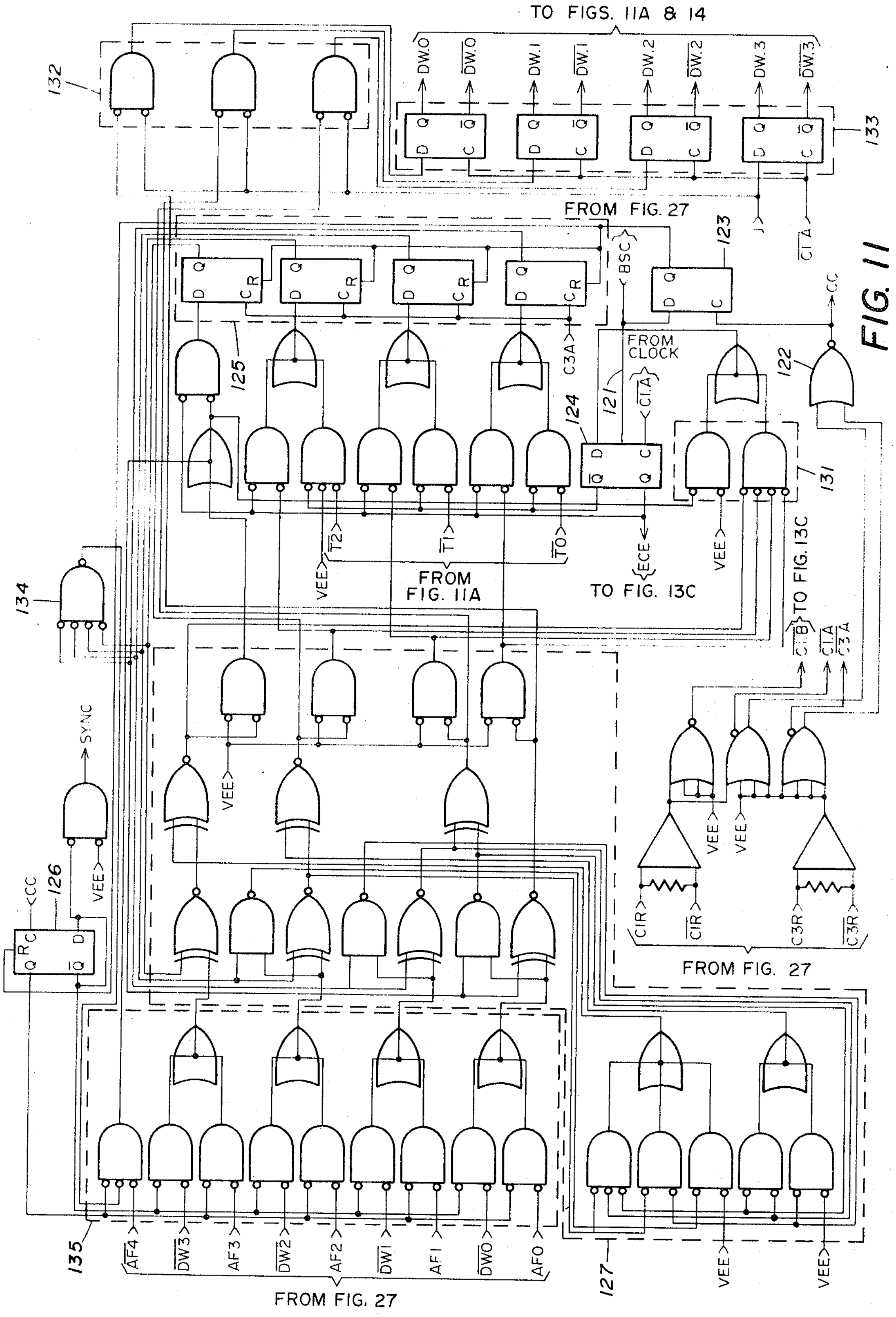
FIG. 11 is a logic diagram of the weight tracking circuitry included within the digital averager shown in FIG. 9.
Figure 11A:
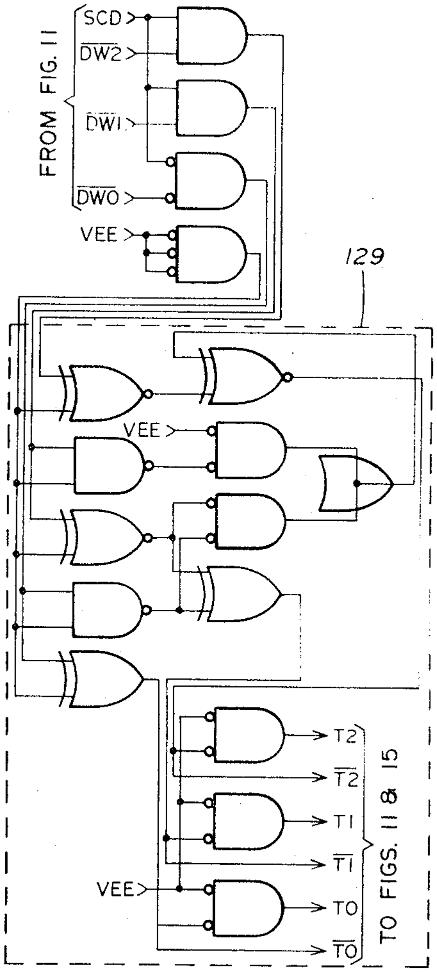
FIG. 11A is a logic diagram of a three bit adder which forms a part of the weight tracking circuitry shown in FIG. 11.

The weight tracking unit 81, FIG. 9, is the controller for the entire averaging process. A process control computer supplies an averaging factor signal (AF), a begin scan signal (BSC) indicative of the start of data from a new scan cycle of the retina and clock pulses (C1 and C3) to the weight tracking circuit. The circuit uses the parameters AF, BSC, C1 and C3 to generate the following three basic control signals which are required by the other elements of the averager logic circuitry to perform the averaging steps:

1. ECE is an "Equivalent Cell Edge." The signal is true when the current actual cell contains the last segment required to complete the current equivalent cell;
2. DW is a four bit binary number which is equal to the number of segments from the current actual cell required to complete the current equivalent cell (the values of DW range from 1 to 8); and
3. T is a three bit binary number which is equal to the number of segments of the current actual cell which will be used in forming the next equivalent cell (T=8 − DW). FIG. 10 is a flow diagram of the functions performed by the weight tracking circuit and FIGS. 11 and 11A are logic diagrams of the circuitry which performs the weight tracking functions.

The weight tracking function begins with a C1 clock pulse received from the process control computer at 101. The pulses C1 and C3 which are utilized by the digital averager circuit are the trailing edges of repetitive clock pulses generated and supplied by process control. Upon the occurrence of a C1 pulse at 101 the weight tracker ascertains at 102 whether there is a BSC signal present. The circuit operation can not begin until the BSC = 1 condition is met for the first time in a given cycle of operation. When a BSC signal is received, the circuit initializes itself at 103 by setting I = 0; $ECE_o$ = 1; $T_o$ = 0; and $NT_o$ = 0. I represents the actual cell number being processed at a given instant of time. The subscripts used on the other terms are representative of the data corresponding to the operation AF − $NT_o$, 104, where AF is the averaging factor to be used and $NT_o$ was initially set to zero. Upon the occurrence of a second C1 clock pulse at 101, the BSC signal at 102 will no longer be true and the first actual cell then begins to undergo processing at 105. Moving to step 106, the weight tracker evaluates whether the current sum S is greater than 8. Since register NT is initialized before performing the subtraction AF − NT the term $S_o$ will be equal to the averaging factor on the first actual cell to be examined. If S is greater than 8, circuitry then sets ECE = 0 and DW = 8 at step 107. This is indicative of the fact that a current actual cell does not contain a sufficient number of segments to complete the first equivalent cell, and further, that all eight of the current actual cells will be required to construct the first equivalent cell. At 108, the subtraction T = 8 − DW is performed to evaluate the number of segments of the current actual cell which will be held over and used to construct the next equivalent cell. At the same time, at 109, the function SS = DW + NT is performed. When a C3 clock pulse occurs at 110 the NT register is set equal to SS at step 111 and then the adder is used to perform the function AF − NT to obtain the term S at step 112. The circuit has then generated each one of the signals ECE, DW and T which are available for use by the other elements of the weight tracking logic circuitry. The cycle then begins again with the occurrence of another C1 clock pulse and the absence of a BSC signal indicating that information from the same scan cycle is still in process.

In the event that S is not greater than 8 at 106, ECE = 1 and DW = S are set at step 113. This indicates that the current actual cell does contain a sufficient number of segments to construct the current equivalent cell and that all of the segments contained within the S register will be used to complete the current equivalent cell. The adder is then used at step 114 to perform the function SS = DW + NT. The T term is generated at 115 by performing the function T = 8 − DW to evaluate the number of segments which will be held over from the number of the current actual cell to construct the next equivalent cell. When a C3 clock pulse occurs, at step 116, the NT register is then set equal to the term T at step 117 and the adder is used at step 112 to perform the function AF − NT. The cycle then begins again with the occurrence of another C1 clock pulse.

From the flow diagram of FIG. 10 it may be seen how the terms ECE, Dw and T which are essential for the performance of the logic functions of the digital averager are generated.

Figure 10A:
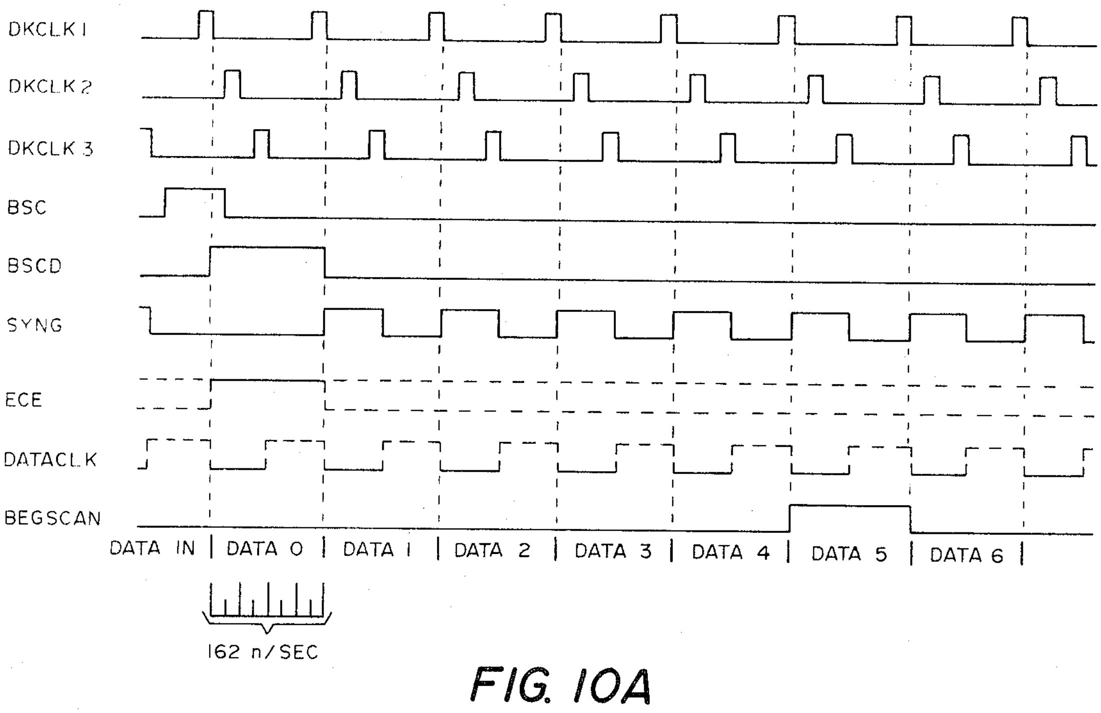
FIG. 10A is a timing diagram illustrating the time sequence within which control pulses for the digital averager occur.

The timing diagram of FIG. 10A illustrates the time sequence in which various control pulses occur.

Referring now to the weight tracking logic circuit of FIG. 11 proper operation is initiated with the receipt of begin scan signal (BSC) on lead 121 from the process controller. When the BSC signal is high and an enable signal is received from clock C1 or C3 through an OR gate 122, a begin scan flip flop 123 is set. The BSC signal is also clocked in to reset the ECE flip flop 124. The "Q" output of begin ECE flip flop 124 provides a reset signal for the NT register 125 and for an adder control flip flop 126. The output of the NT register 125 is used as one input to a four bit adder 127. The adder control flip flop 126 enables certain ones of the gates 128 to introduce the complement $\overline{AF}$ of the averaging factor AF into the other input of the four bit adder 127. The use of the $\overline{AF}$ complement as an input to the adder 127 effectively allows computation of the difference between AF and the value of the signal stored in the NT register 125. Thus, the adder 127 behaves as a subtractor and produces the results $\overline{S}$ = AF − NT.

Upon the occurrence of the next C1 pulse, the value of the adder 127 is examined by the gates 131 and if the $\overline{S}$ signal is less than or equal to 8, the D1 input of the ECE flip flop 124 is high and the flip flop is set so that ECE = 1.

As shown in FIG. 11A, a begin scan delayed signal BSCD resets the output T of a three bit adder 129 to zero. In addition, if $\overline{S}$ is less than 8, the DW signal is set equal to $\overline{S}$ by the AND gates 132 and the DW flip flops 133. However, if $\overline{S}$ is greater than or equal to 8, the J signal is high and the DW flip flops 133 are set equal to 8 because the weight assigned each cell, i.e. the maximum number of segments presumed to comprise each cell, is a maximum of 8. The signal C1 clocks the DW value out of the flip flips 133 into the three bit adder 129 which performs the subtraction DW − 8 to produce the output T signal.

At the same time as the T signal is produced by the three bit adder 129 the same C1 clock pulse toggles the adder control flip flop 126 to route the DW signal into one of the inputs of the four bit adder 127. The output from adder 127 is equal to NT + DW. S is then equivalent to the total number of segments used to construct the current equivalent cell.

Upon the occurrence of the next clock pulse C3, the NT register 125 is updated. If the ECE flip flop 124 has been previously set equal to 1, the NT register 125 is then set equal to T. If, however, ECE is equal to zero, the NT register is then set equal to S. The clock pulse C3 also resets the adder control flip flop 126 to reroute the $\overline{AF}$ signal into the adder 127 to be used again as subtractor to produce an $\overline{S}$ signal. Upon the occurrence of the next C1 clock pulse, the cycle begins all over again as shown in the flow diagram of FIG. 10.

When the averaging factor AF is between 8 and 15, the four bit adder 127 has sufficient capacity to accomplish the function of $\overline{S} = \overline{AF} + NT$ as is described above. However, when AF equals 16, the gates 134 and 135 provide the required bit necessary to accomplish the subtraction.

The weight tracking circuit utilizes the three input data signals of the averaging factor (AF), the begin scan signal (BSC) and clock signals (C1 and C3). Based upon these signals, the weight tracking circuit generates signals signifying an equivalent cell edge ECE, the number of segments of the current actual cell required to make the current equivalent cell DW, and the number of segments of the current actual cell which will be used to make the next equivalent cell T. The values of ECE, DW and T which are produced by the weight tracker for each of the individual averaging factors used for various sizes of character fonts are given in Table IV as an illustration for averaging factor 11. The values of these parameters for all the other averaging factors utilized by the system are obtained in an identical fashion.

TABLE IV

AVERAGING FACTOR = 11

| Actual Cell Number | Value | DW | T | ECE | Equivalent Cell Value |
|---|---|---|---|---|---|
| 1 | 0 | 8 | 0 | 0 | |
| 2 | 1 | 3 | 5 | 1 | 0 |
| 3 | 2 | 6 | 2 | 1 | 1 |
| 4 | 3 | 8 | 0 | 0 | |
| 5 | 4 | 1 | 7 | 1 | 2 |
| 6 | 5 | 4 | 4 | 1 | 4 |
| 7 | 6 | 7 | 1 | 1 | 5 |
| 8 | 7 | 8 | 0 | 0 | |
| 9 | 8 | 2 | 6 | 1 | 7 |
| 10 | 9 | 5 | 3 | 1 | 8 |
| 11 | 10 | 8 | 0 | 1 | 9 |
| 12 | 11 | 8 | 0 | 0 | |
| 13 | 12 | 3 | 5 | 1 | 11 |
| 14 | 13 | 6 | 2 | 1 | 12 |
| 15 | 14 | 8 | 0 | 0 | |
| 16 | 15 | 1 | 7 | 1 | 13 |
| 17 | 0 | 4 | 4 | 1 | 9 |
| 18 | 1 | 7 | 1 | 1 | 0 |
| 19 | 2 | 8 | 0 | 0 | |
| 20 | 3 | 2 | 6 | 1 | 2 |
| 21 | 4 | 5 | 3 | 1 | 3 |
| 22 | 5 | 8 | 0 | 1 | 4 |
| 23 | 6 | 8 | 0 | 0 | |
| 24 | 7 | 3 | 5 | 1 | 6 |
| 25 | 8 | 6 | 2 | 1 | 7 |
| 26 | 9 | 8 | 0 | 0 | |
| 27 | 10 | 1 | 7 | 1 | 8 |
| 28 | 11 | 4 | 4 | 1 | 10 |
| 29 | 12 | 7 | 1 | 1 | 11 |
| 30 | 13 | 8 | 0 | 0 | |
| 31 | 14 | 2 | 6 | 1 | 13 |
| 32 | 15 | 5 | 3 | 1 | 14 |
| 33 | 0 | 8 | 0 | 1 | 4 |
| 34 | 1 | 8 | 0 | 0 | |
| 35 | 2 | 3 | 5 | 1 | 1 |
| 36 | 3 | 6 | 2 | 1 | 2 |
| 37 | 4 | 8 | 0 | 0 | |
| 38 | 5 | 1 | 7 | 1 | 3 |
| 39 | 6 | 4 | 4 | 1 | 5 |
| 40 | 7 | 7 | 1 | 1 | 6 |
| 41 | 8 | 8 | 0 | 0 | |
| 42 | 9 | 2 | 6 | 1 | 8 |
| 43 | 10 | 5 | 3 | 1 | 9 |
| 44 | 11 | 8 | 0 | 1 | 10 |
| 45 | 12 | 8 | 0 | 0 | |
| 46 | 13 | 3 | 5 | 1 | 12 |
| 47 | 14 | 6 | 2 | 1 | 13 |
| 48 | 15 | 8 | 0 | 0 | |
| 49 | 0 | 1 | 7 | 1 | 13 |
| 50 | 1 | 4 | 4 | 1 | 0 |
| 51 | 2 | 7 | 1 | 1 | 1 |
| 52 | 3 | 8 | 0 | 0 | |
| 53 | 4 | 2 | 6 | 1 | 3 |
| 54 | 5 | 5 | 3 | 1 | 4 |
| 55 | 6 | 8 | 0 | 1 | 5 |
| 56 | 7 | 8 | 0 | 0 | |
| 57 | 8 | 3 | 5 | 1 | 7 |
| 58 | 9 | 6 | 2 | 1 | 8 |
| 59 | 10 | 8 | 0 | 0 | |
| 60 | 11 | 1 | 7 | 1 | 9 |
| 61 | 12 | 4 | 4 | 1 | 11 |
| 62 | 13 | 7 | 1 | 1 | 12 |
| 63 | 14 | 8 | 0 | 0 | |
| 64 | 15 | 2 | 6 | 1 | 14 |
| 65 | 0 | 5 | 3 | 1 | 8 |
| 66 | 1 | 8 | 0 | 1 | 0 |

DIGITAL AVERAGING CIRCUITS

The other circuit elements including mutliplier 83, multiplier 84, accumulator 86 and divider 87 which comprise the digital averager, FIG. 9, use the control signals generated by the weight tracking circuit to perform the averaging algorithm on the input cell data. The flow diagram shown in FIG. 12 charts the order of the functions which are performed by the digital averager. Since the generation of the control signals by the weight tracking circuit are illustrated in the flow diagram of FIG. 10, they are omitted from FIG. 12 for simplification.

Figure 12:
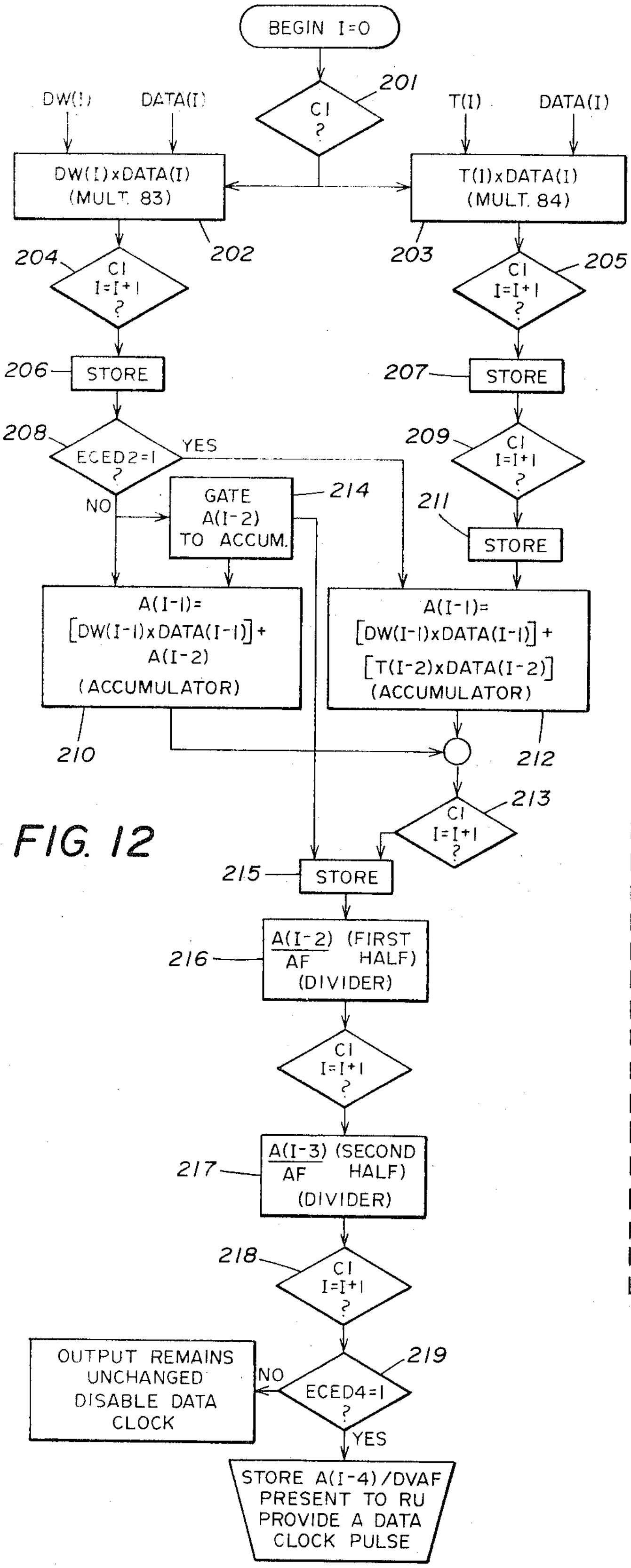
FIG. 12 is a flow diagram illustrating the function and operation of the digital averager shown in FIG. 9 exclusing the weight tracking circuitry which is illustrated in FIG. 11.

Referring now to FIG. 12, wherein a clock pulse C1 occurs at 201, a data signal and the generated value of DW are clocked into multiplier 83 at step 202 while data and the generated signal T are clocked into multiplier 84 at stage 203. Multiplication is performed in both the multipliers upon the occurrence of the next C1 pulse at 204 and 205. The respective products from the multipliers are stored at 206 and 207. Upon the occurrence of the next C1 clock pulse at 209 the product from multiplier 84 is again stored at step 211 while at the same time the ECE signal is evaluated to see whether or not it is equal to one at point 208. If ECE is true then product from multiplier 83 is stored at 206 and the product from multiplier 84 is stored at 211. Both products are also introduced into the accumulator at 212. If, however, ECE is not equal to one, the product from multiplier 83, stored at 206, is input to the accumulator 210. Since the ECE signal is not true, there is insufficient data stored in the accumulator at 210 to finish a current equivalent cell.

The data stored in the accumulator at 212 is then clocked on the next C1 cycle of 213 back through a gate at 214 via the storage stage 215, and then from the gate into the accumulator 210 where it is combined with the additional product required. The output of the accumulator 210 is then clocked through stops 213 and 215 where the first half is divided by the averaging factor at step 216 and the second half is divided at step 217. Upon the occurrence of the next clock pulse at step 218, ECE is then tested to see if it is equal to one at step 219. If the signal is false, the output of the divider is held unchanged and the data clock disabled. However, if ECE is equal to one the divided averaged equivalent cell value is then presented to the recognition unit for further processing.

Figure 13B:
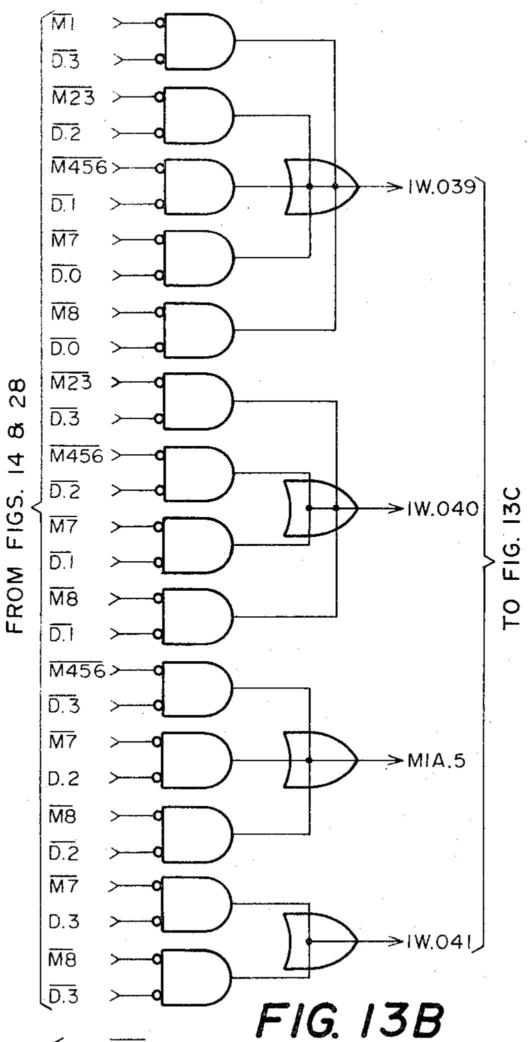
FIGS. 13A, 13B and 13C are logic diagrams of the multiplication logic of multiplier 83 of the digital averager of FIG. 9.
Figure 13A:
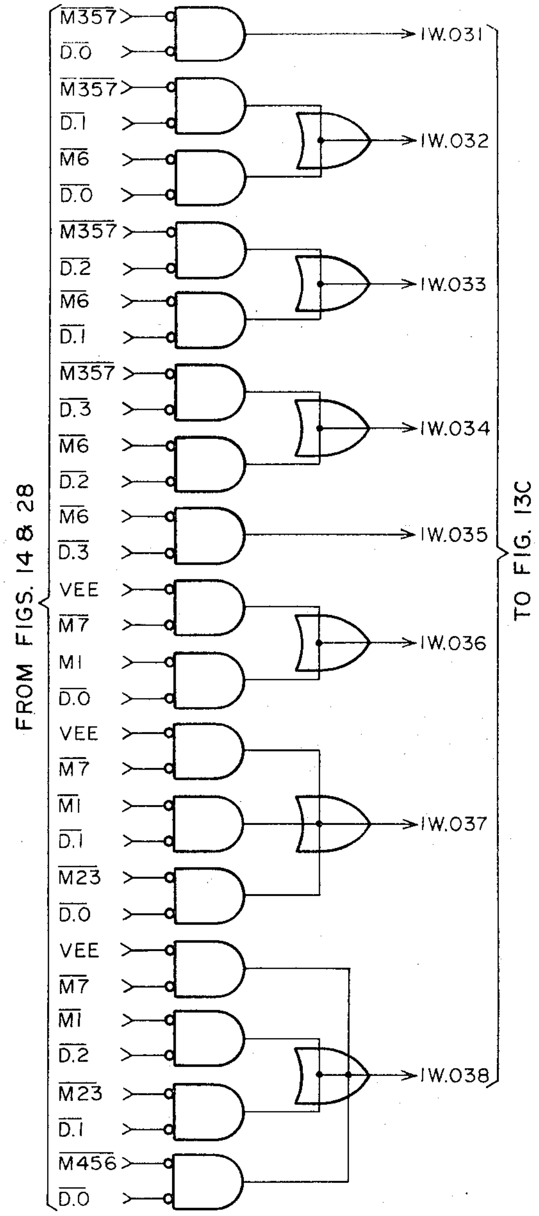
Figure 13C:
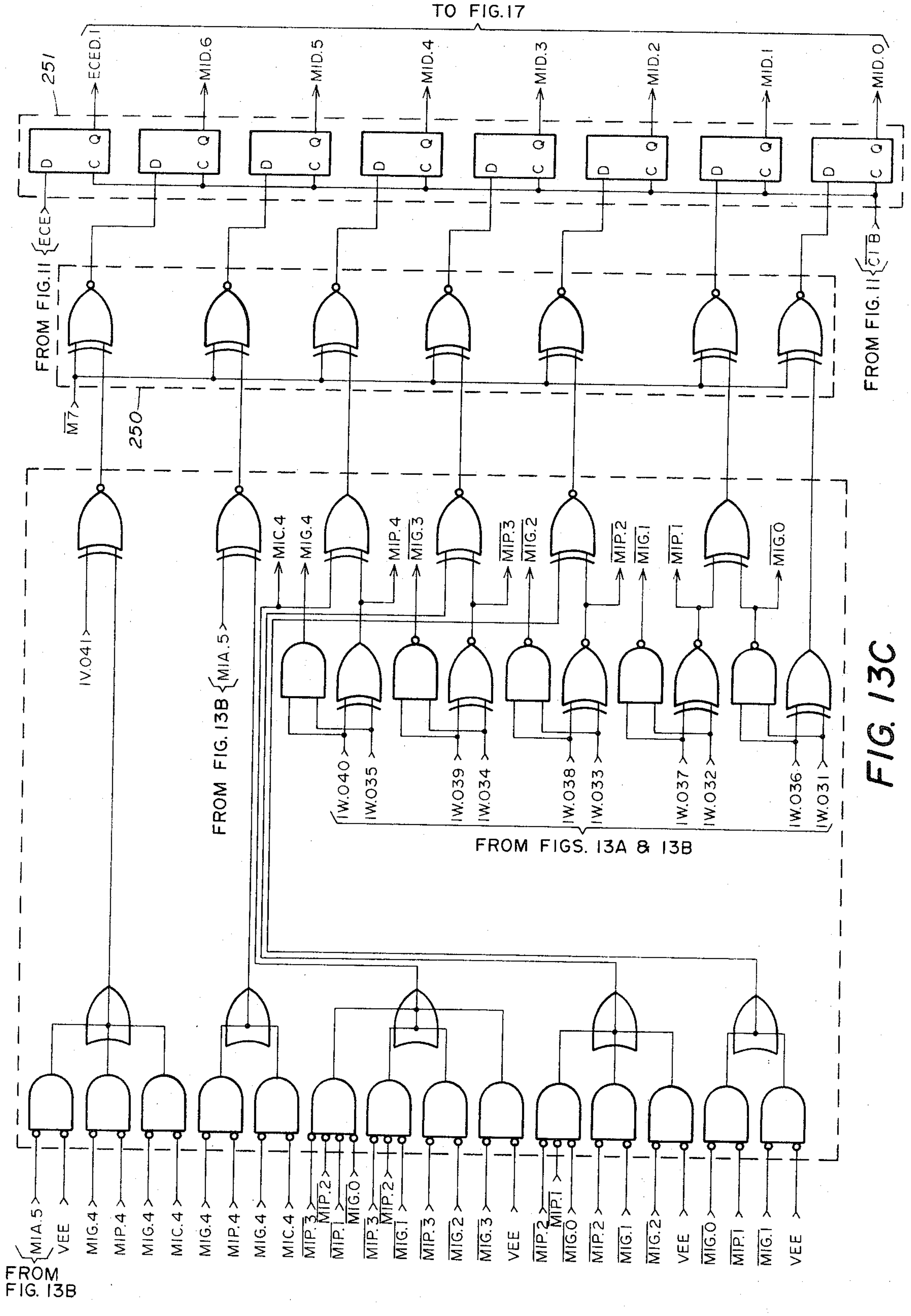
Figure 16A:
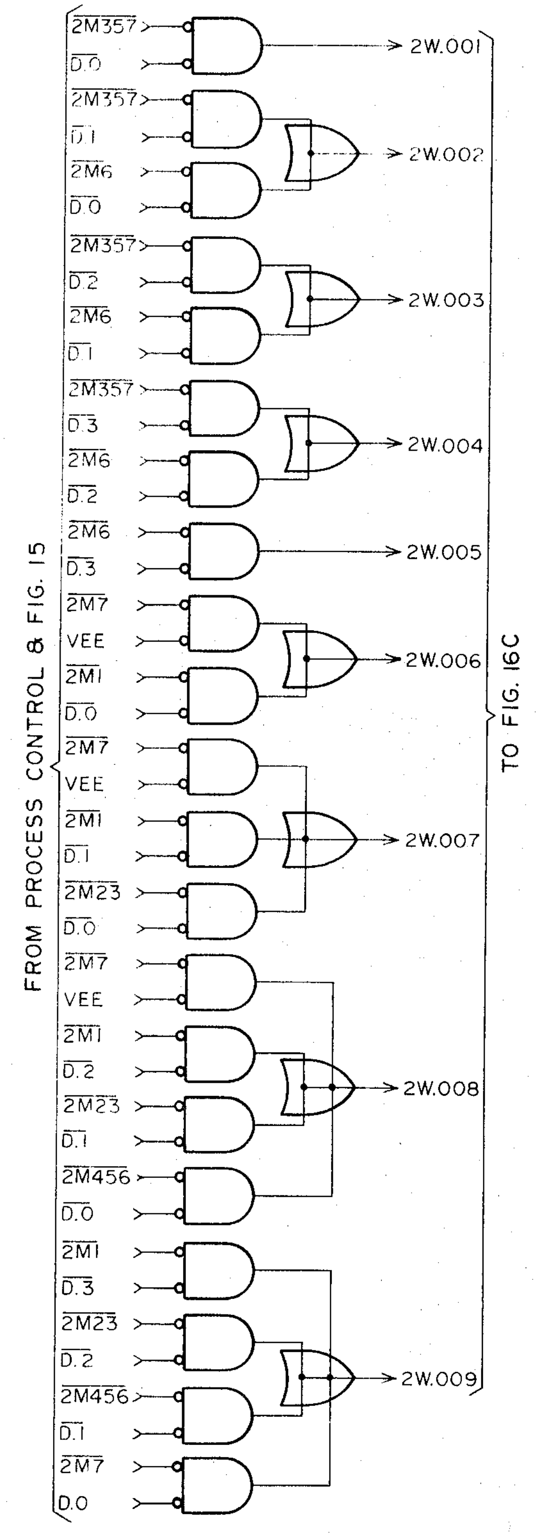
FIGS. 16A, 16B and 16C are logic diagrams of the multiplication logic of multiplier 84 of the digital averager shown in FIG. 9.
Figure 16B:
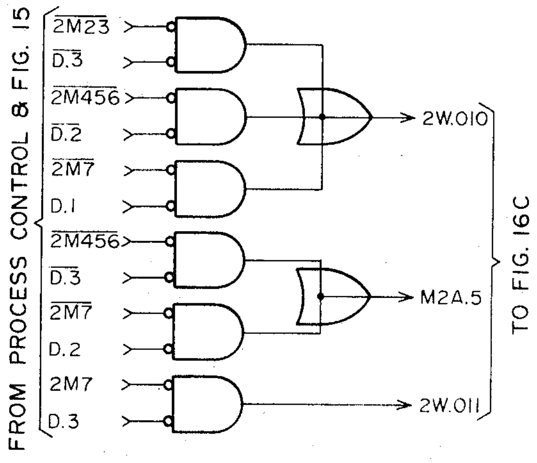
Figure 15:
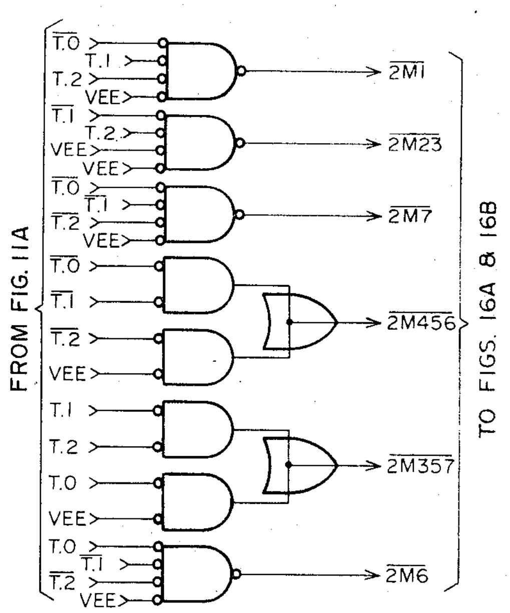
FIG. 15 is a logic diagram of a circuit for generating multiplier control signals for the multiplication logic shown in FIGS. 16A, 16B and 16C.
Figure 16C:
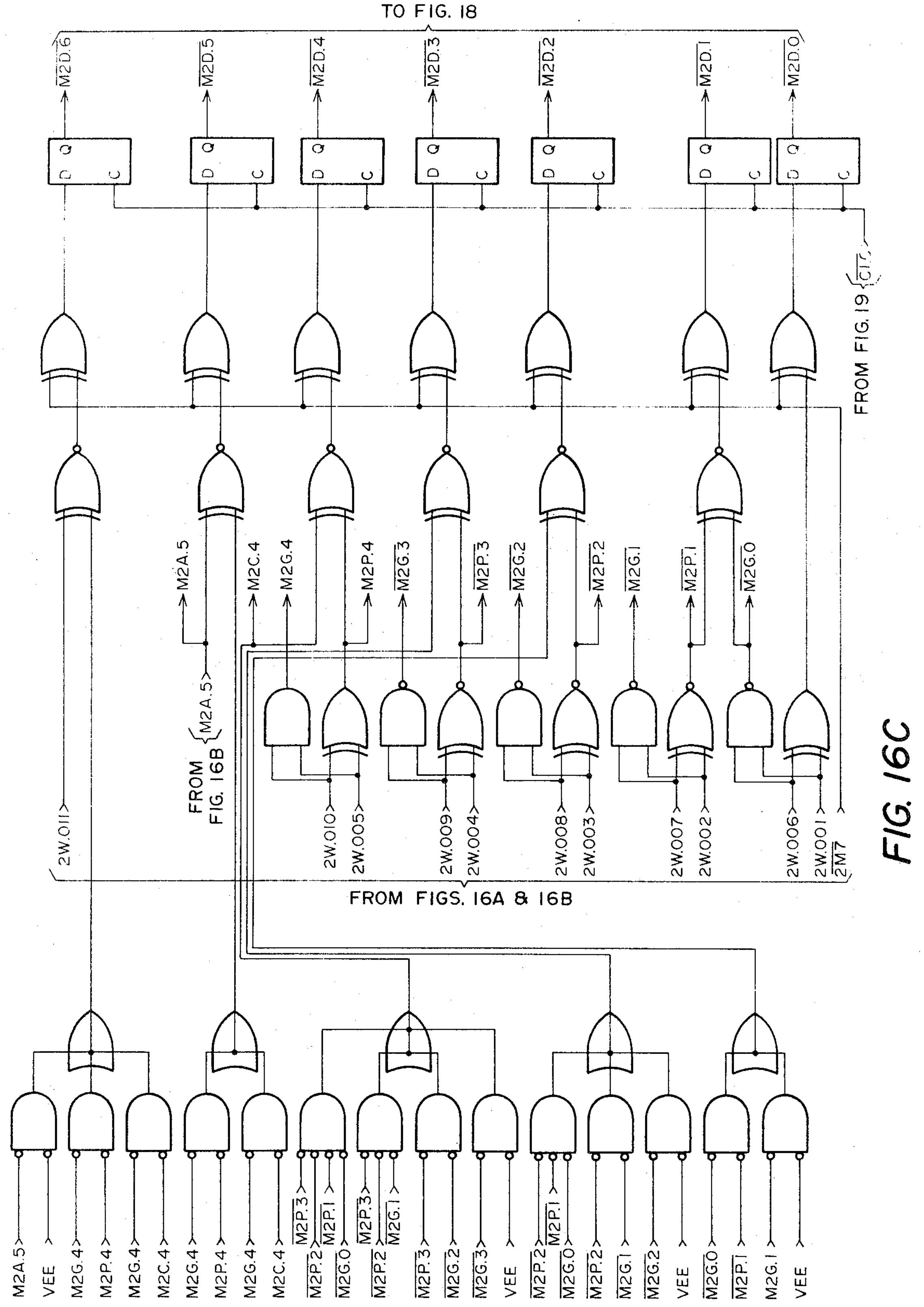

The multiplier 83, multiplier 84, accumulator and divider logic circuits which perform the functions are shown in the flow diagram of FIG. 12. When a C1 clock pulse occurs, the input four bit cell data words (D) from the analog/digital converter are clocked into the multiplication logic, shown in FIGS. 13A, 13B and 13C of multiplier 83. At the same time, the DW signal from the weight tracking circuitry is clocked, the logic of FIG. 14 supplies multiplier control signals to the multiplication logic of multiplier 83. Also when C1 occurs the T signal from the weight tracker is clocked into the logic of FIG. 15 which supplies multiplier control signals to the multiplication logic of multiplier 84 shown in FIGS. 16A, 16B and 16C along with cell data words (D). During the next C1 pulse multiplier 83 data is input into the accumulator of FIG. 17. At the same time the multiplier 84 output is clocked into a storage register shown in FIG. 18, to allow a one clock cycle delay. It is then input into the accumulator of FIG. 17 by the next C1 pulse, through a gating arrangement shown in FIG. 19.

A somewhat more detailed explanation of the operation of each one of the circuits comprising the digital averager is as follows:

MULTIPLIER 83

The function of multiplier 83 is to multiply DW signals by actual cell data D. The multiplier employs the decoding of the multiplier signal DW, shifting of the data signal D, addition of the shifted data by a five by seven bit adder and an output storage register. The gates of FIG. 14, having DW signals as input serve to decode the DW signals and control shifting of the data for presentation of the multiplication logic of FIGS. 13B and 13C. The decoding states of multiplier 83 are shown in TABLE V.

TABLE V

| Input | Decoder output | | | | | | |
|---|---|---|---|---|---|---|---|
| | DVM 1 | DVM 23 | DVM 456 | DVM 7 | DVM 8 | DVM 357 | DVM 6 |
| DVDW: | | | | | | | |
| 1 | 1 | 0 | 0 | 0 | 0 | 0 | 0 |
| 2 | 0 | 1 | 0 | 0 | 0 | 0 | 0 |
| 3 | 0 | 1 | 0 | 0 | 0 | 1 | 0 |
| 4 | 0 | 0 | 1 | 0 | 0 | 0 | 0 |
| 5 | 0 | 0 | 1 | 0 | 0 | 1 | 0 |
| 6 | 0 | 0 | 1 | 0 | 0 | 0 | 1 |
| 7 | 0 | 0 | 0 | 1 | 0 | 1 | 0 |
| 8 | 0 | 0 | 0 | 0 | 1 | 0 | 0 |

Figure 14:
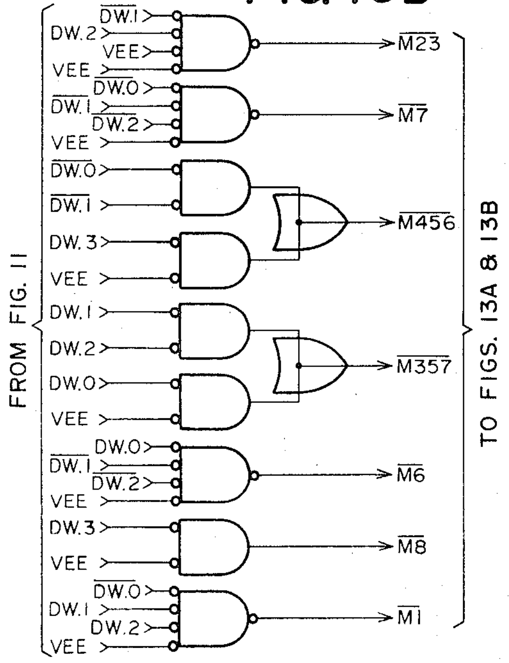
FIG. 14 is a logic diagram of a circuit for generating multiplier control signals for the multiplication logic shown in FIGS. 13A, 13B and 13C.

The decoder output lines of FIG. 14 control the lines of the input data into the adder. For each position the data is shifted, a multiplication by 2 is performed. For example when DW is equal to 5, data in one half of the adder is shifted twice (DATA × 4) and the other half of the adder receives unshifted data (DATA × 1). Assuming DATA = 7 = 0111

Into one side of the adder:

(DATA × 4) = 0011100 = 28

(DATA × 1) = xx00111 = 7

(DATA × 5) = 0100011 = 35

For DW multipliers other than 7, shifting and adding is accomplished by adding DATA after it has been shifted by powers of two. For a DW of 7, 3 levels of addition would normally be required (DATA × 1 + DATA × 2 + DATA × 4). However, in the case DW = 7, DATA × 1 is subtracted from DATA × 8 to obtain multiplication by 7. In the circuitry, DATA which has been shifted 3 places is inverted and added with unshifted DATA. This results in the one's complement of DATA × 7. The gates 250 (FIG. 13C) on the adder output are used to invert the output when the multiplier is 7, thus restoring the product to a positive number. For any other multiplier, the gates 250 do not invert the adder output and DATA is clocked out of the circuit and stored by the flip flops 251. The summed output from multiplier 83 is a 7 bit word term MID.

MULTIPLIER 84

The function of multiplier 84 is to multiply the actual cell data D by the signal T generated by the weight tracking circuitry. Multiplier 84 performs its large functions in exactly the same manner as multiplier 83, except that the output is always the complement of the product. The gates of FIG. 15, having T signals as input, decode T and control shifting of the data in the multiplication logic of FIGS. 16A, 16B and 16C. The decoding states of multiplier 84 are as shown in Table VI.

TABLE VI

| Input | Decoder outputs | | | | | |
|---|---|---|---|---|---|---|
| | DV2M1 | DV2M23 | DV2M456 | DV2M7 | DV2M357 | DV2M6 |
| DVT: | | | | | | |
| 0 | 0 | 0 | 0 | 0 | 0 | 0 |
| 1 | 1 | 0 | 0 | 0 | 0 | 0 |
| 2 | 0 | 1 | 0 | 0 | 0 | 0 |
| 3 | 0 | 1 | 0 | 0 | 1 | 0 |
| 4 | 0 | 0 | 1 | 0 | 0 | 0 |
| 5 | 0 | 0 | 1 | 0 | 1 | 0 |
| 6 | 0 | 0 | 1 | 0 | 0 | 1 |
| 7 | 0 | 0 | 0 | 1 | 1 | 0 |

The output of multiplier 84 is a seven bit word and is termed $\overline{M2D}$. This output signal is used as the input to the storage circuit shown in FIG. 18, which comprises a seven bit parallel shift register for delaying the multiplier 84 output signal on clock cycle. The output of the storage register is termed $\overline{M2DD}$.

ACCUMULATOR CIRCUIT

Figure 17:
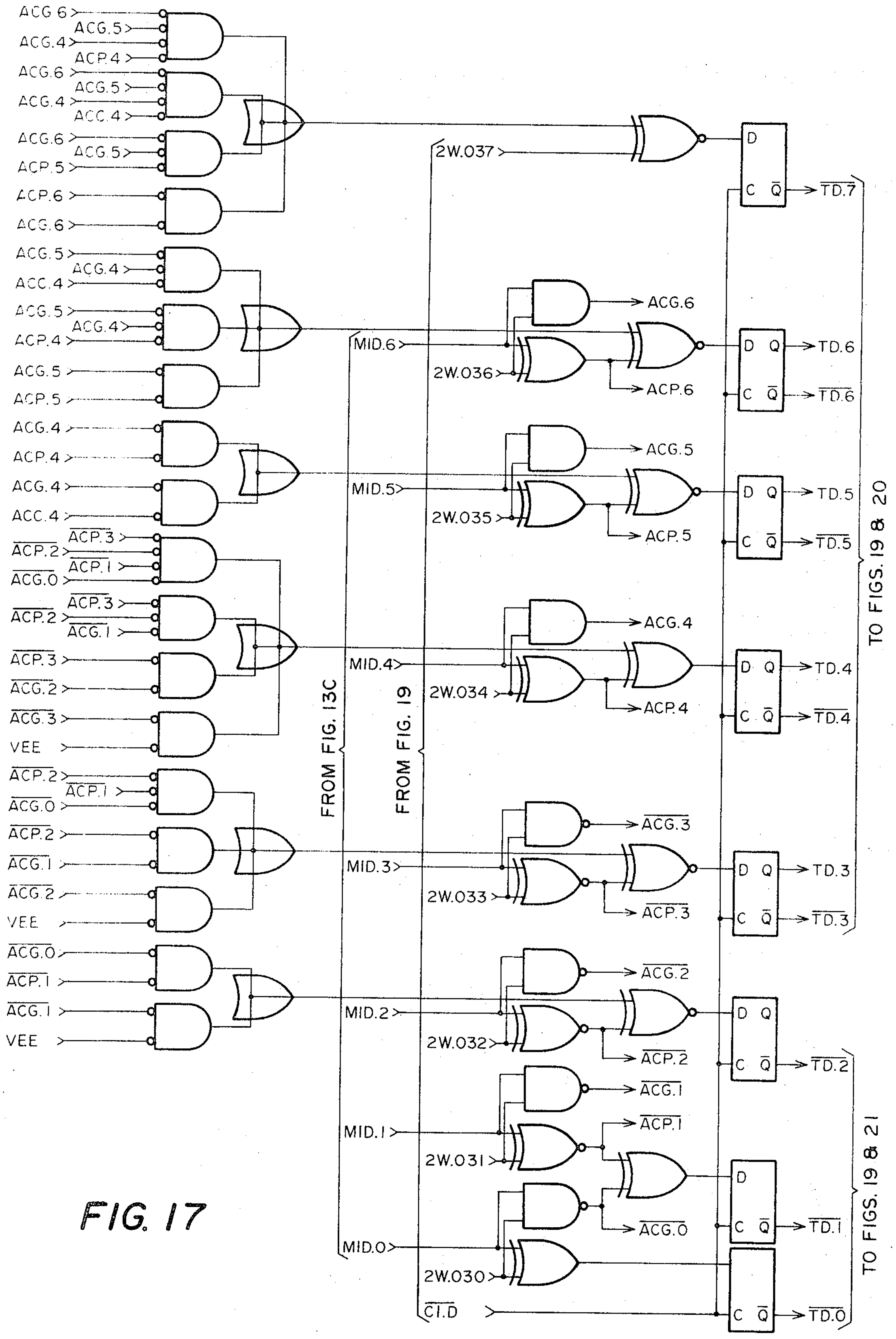
FIG. 17 is a logic diagram of the accumulator of the digital averager shown in FIG. 9.
Figures 18, 19:
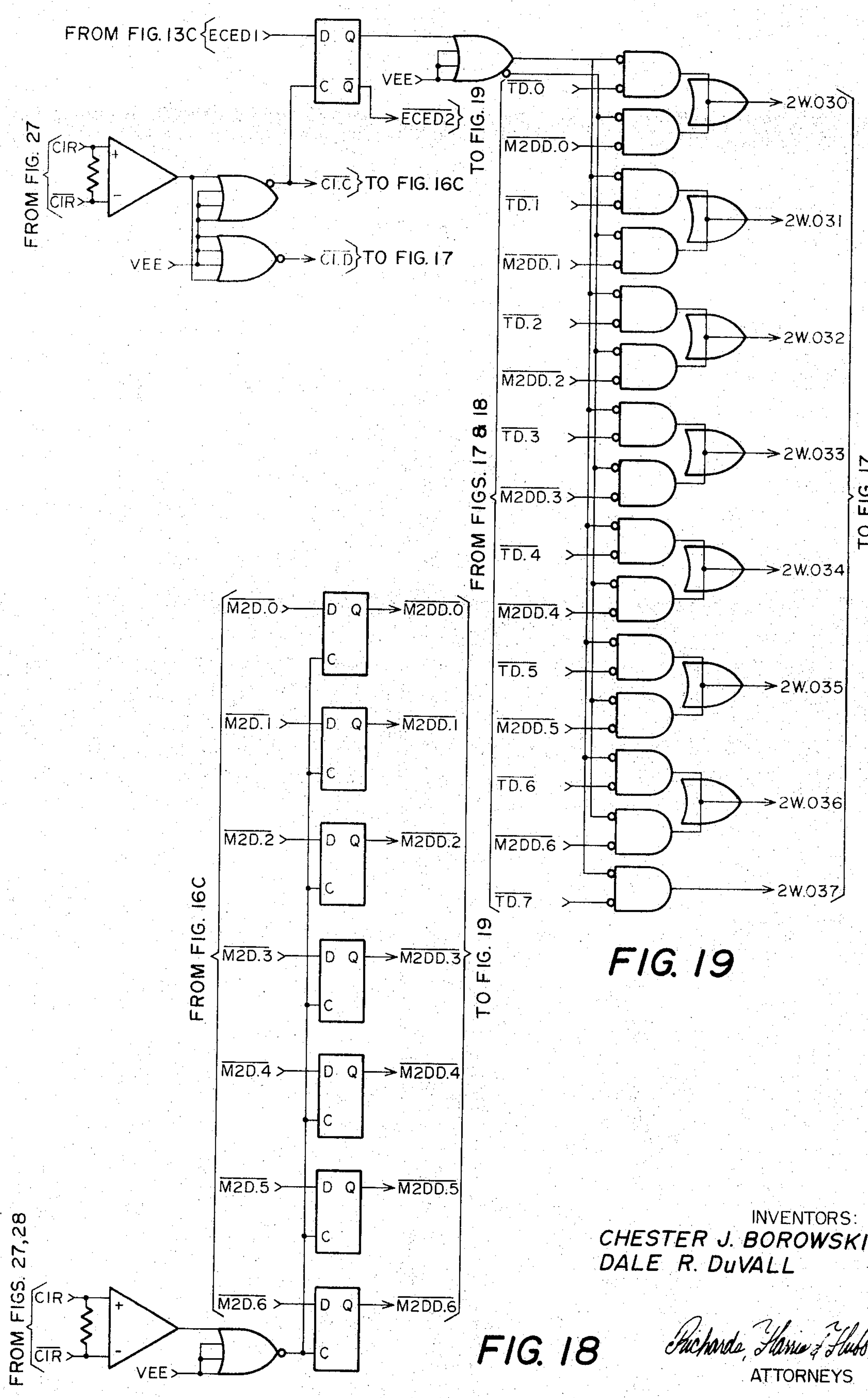
FIG. 18 is a logic diagram of a storage register of the digital averager shown in FIG. 9.
FIG. 19 is a logic diagram of a gating arrangement for transferring signals from the storage register of FIG. 18 into the accumulator of FIG. 17.
Figure 20:
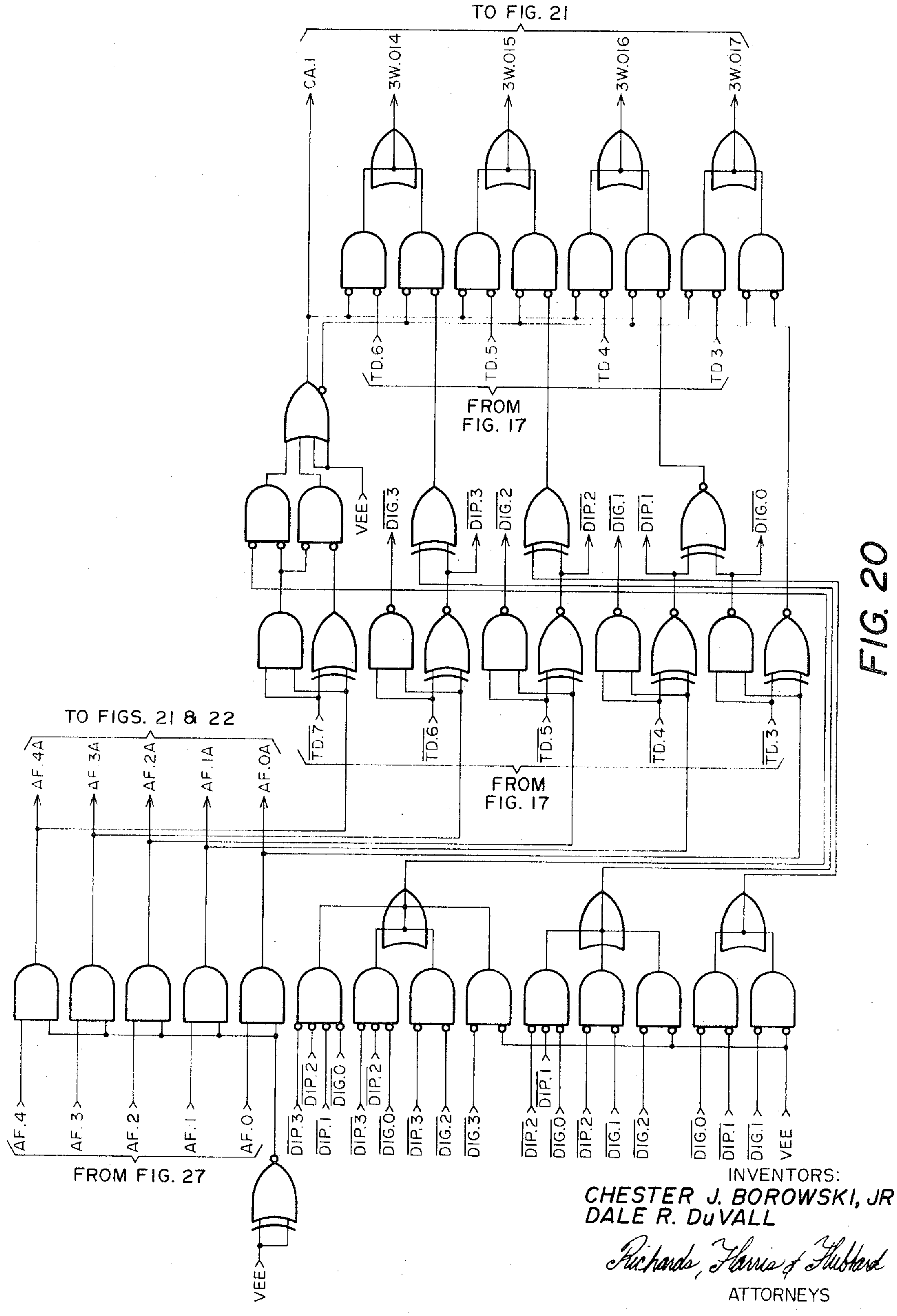
FIGS. 20–23 are logic diagrams of the divider circuit shown in FIG. 9 along with miscellaneous data clocking logic employed in the division operation.
Figure 21:
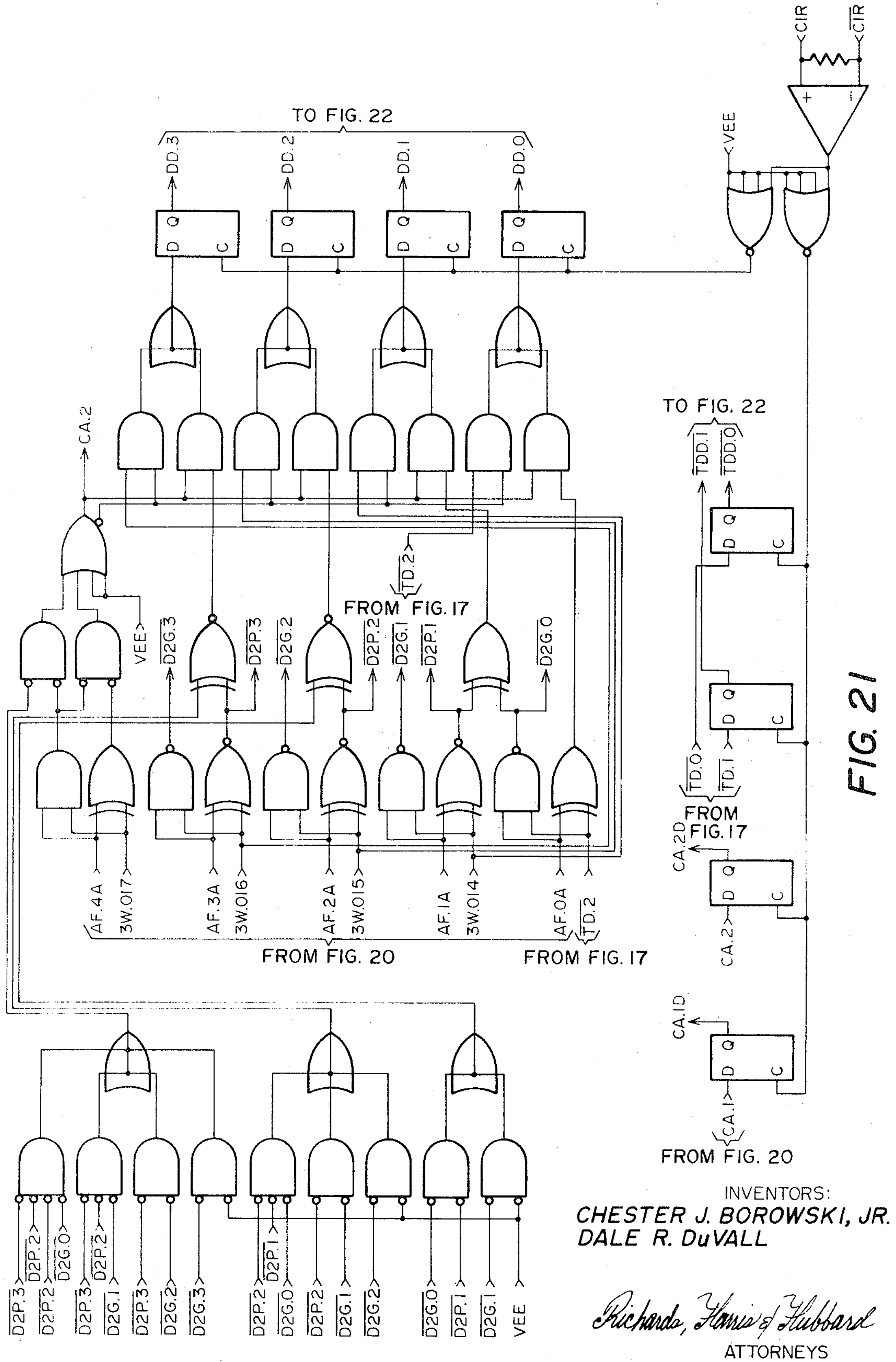
Figures 22, 23:
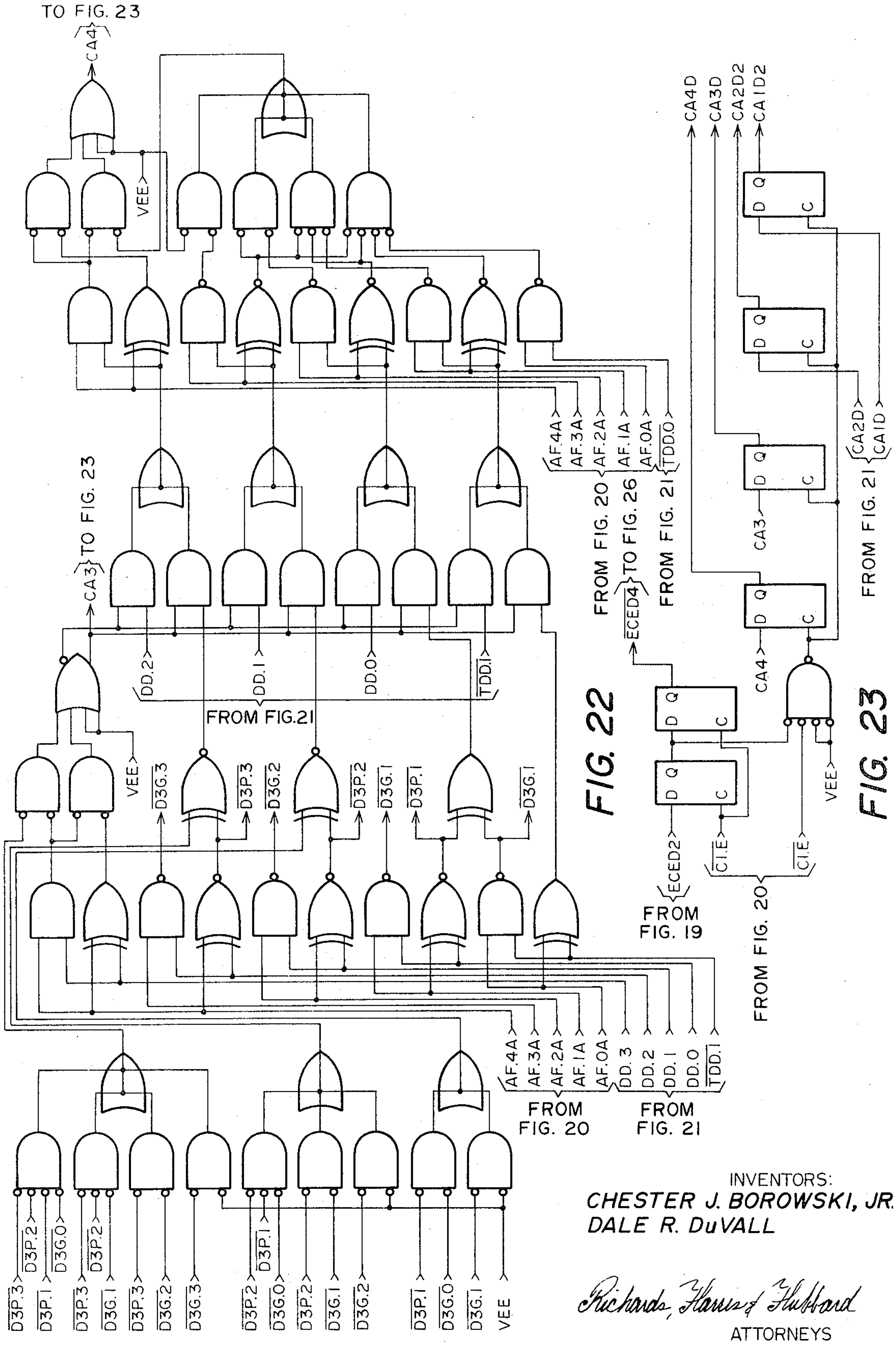

FIG. 17 shows the accumulator which is a 7 by 8 bit adder having one input controlled by the ECED2 signal applied to the accumulator gating logic shown in FIG. 19. If ECED2 is equal to one, then the multiplier 83 output is added with the delayed data from multiplier 84. If, however, ECED2 is equal to zero, the multiplier 83 data is added to the result of the accumulator from the previous clock cycle.

DIVIDER CIRCUIT

Upon the occurrence of each C1 pulse the accumulator output data, (TD) is presented to the input of a divider circuit shown in FIGS. 20–23. The divider divides the averaging factor AF into the accumulator output during the passage of two clock cycles. The two most significant bits of the division, CA1 and CA2 are determined during the first clock cycle. The two least significant bits, CA3 and CA4, are determined on the second clock cycle. Interim data is clocked between the first and second portions of the divider by flip flops 261–268 of FIG. 21. The results of the division, CA4, CA3, CA2D and CA1D are clocked out by flip flops 271–274 of FIG. 23 when DCED 3 (ECE delayed by three clock cycles) is true. This clocked out data, CA4D, CA3D, CA2D2 and CA1D2 correspond to the 4 bits of the quotient. The divider uses the complement of the accumulated data so that it can employ one's complement subtraction to obtain the quotient. The carry outputs of each adder indicate valid division, i.e., one or zero, as is done in normal binary division.

Whether the output of the divider circuitry results in a complete equivalent cell or not is determined by the condition of the ECED3 signal (ECE delayed by three clock cycles). When ECED3 is equal to one, the divider quotient represents an equivalent cell and the output is clocked out to the recognition unit (not shown). If, however, ECED3 is equal to zero, insufficient data has been accumulated to form an equivalent cell and the divider quotient is incomplete. The output data presented to the recognition unit remains at the previous equivalent cell until more data is accumulated and presented to the divider to complete the next equivalent cell. When the new data is presented to the recognition unit by the divider, a data clock pulse is also transmitted along with it to synchronize the operation of the associated circuitry.

DATA CLOCKING CIRCUIT

The data clocking circuit contains the receivers and drivers which route data into and out of the digital averager as well as distribute the data and timing signals required for the digital averaging operation. The data clock and begin scan signal to be output to the recognition unit are also generated within the circuitry.

Signals are received from the process control computer by the data clocking circuits and distributed to the digital averager. The following nomenclature is used in FIGS. 24–28 which show the data clocking circuitry.

CQDNF (0 through 4) is the averaging factor. This signal is clocked into the digital averager once per scan by the falling edge of the begin stroke signal BSC;

CQBEGSTR indicates a begin stroke. This signal is received, buffered and routed to the digital averager as BSC;

DKCLK 1, DKCLK2, DKCLK 3 are three clock signals which are received, buffered, and distributed to the digital averager as C1, C2 and C3;

ADBIT (0 through 3) is a data word, (0000 = Black, 1111 = White). Data is clocked and distributed to the digital averager circuitry by the falling edge of C1 clock pulse. Data words are designated by the term D (0–3).

SC (0 through 3) is a test word generated by the test data generator. It is distributed to the digital averager instead of the actual data (D) when the signal TMODE is high.

TMODE is a control signal which disables actual data and inserts test data into the digital averager when it is true. It is manually controlled by a switch on the normalizer test panel.

Figures 24, 28:
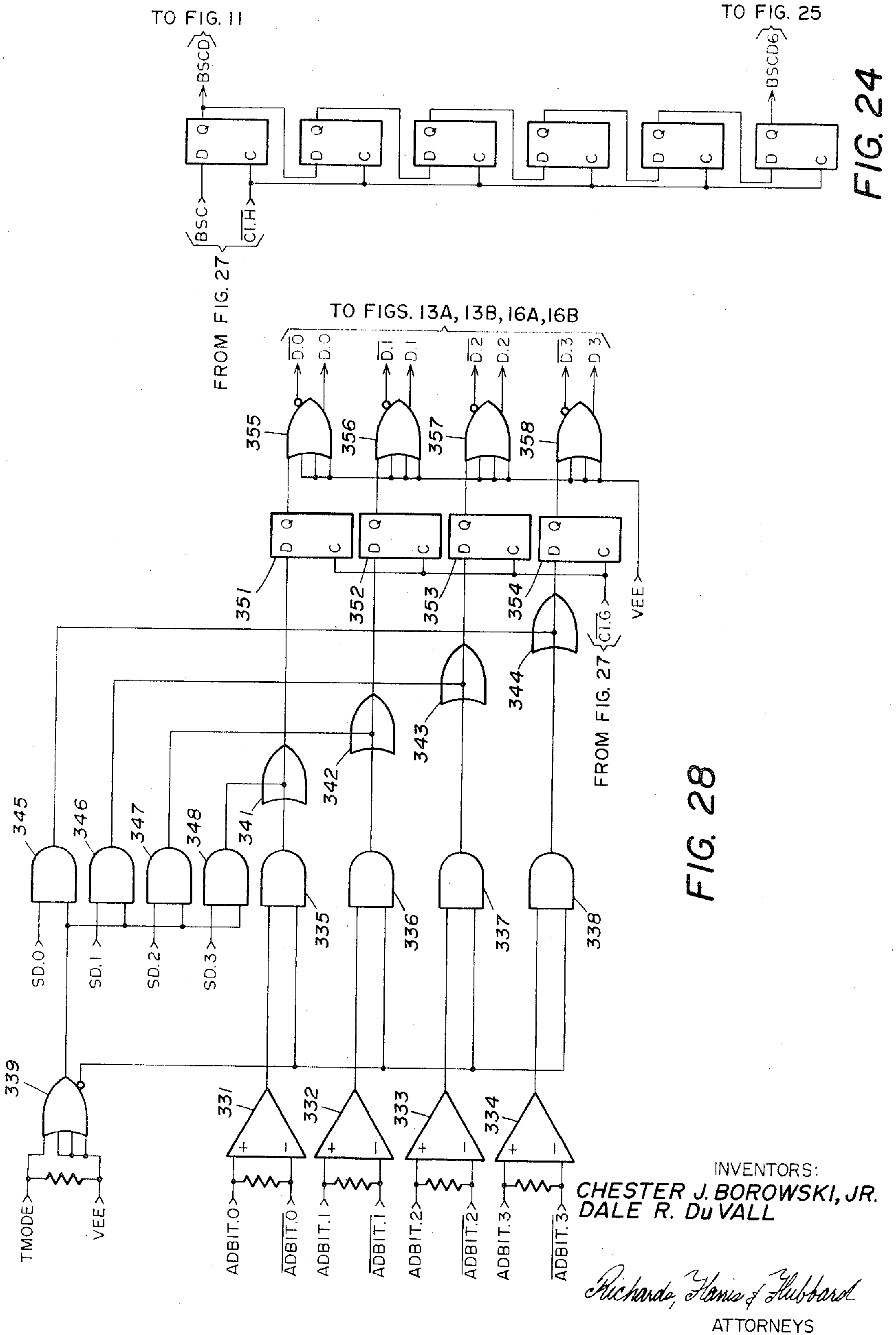
FIGS. 24–28 are logic diagrams of the data clocking circuitry which times and synchronizes the different logic functions used in the digital averager shown in FIG. 9.

Referring to FIG. 24 the begin stroke signal, CQBEGSTR is received and delayed by one clock cycle and then distributed to the digital averager as BSCD. The signal is also delayed an additional five clock cycles to become BSCD6. The delayed BSCD6 is then buffered by a register 281 of FIG. 25 and routed differentially to the recognition unit as begin scan signal BEGSCAN, to synchronize the operations of normalization and recognition.

Figure 26:
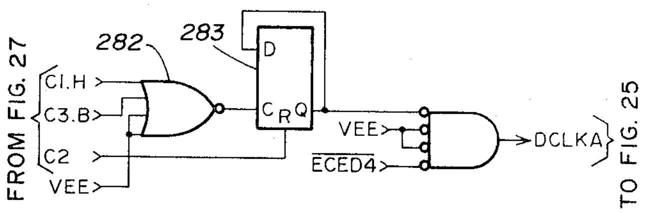

The data clock is generated by the logic of FIG. 26 when the C1 and C3 clock pulses are logically combined in an OR gate 282 the output of which is inverted to toggle a flip flop 283 at twice the clock rate. The C2 clock pulses provide a reset signal to insure that the flip flop 283 is always reset during the first half of the clock cycle. The output Q of flip flop 283 is gated out to the logic of FIG. 25 as DCLKA when the $\overline{\text{ECED4}}$ signal (DECE delayed 4 clock cycles) is true. The DCLKA signal is buffered by a gate 284 of FIG. 25 and presented it to the recognition unit as data clock signal DATA CLK. The gates 285–288 of FIG. 25 buffer the divider quotient CA1D2, CA2D2, CA3D, and CA4D and invert it before routing it to the recognition unit as the data bits. The inversion is necessary because the recognition unit employed requires that the data word 1111 represent black and 0000 represent white, just the opposite from the references in the normalizer.

Figure 27:
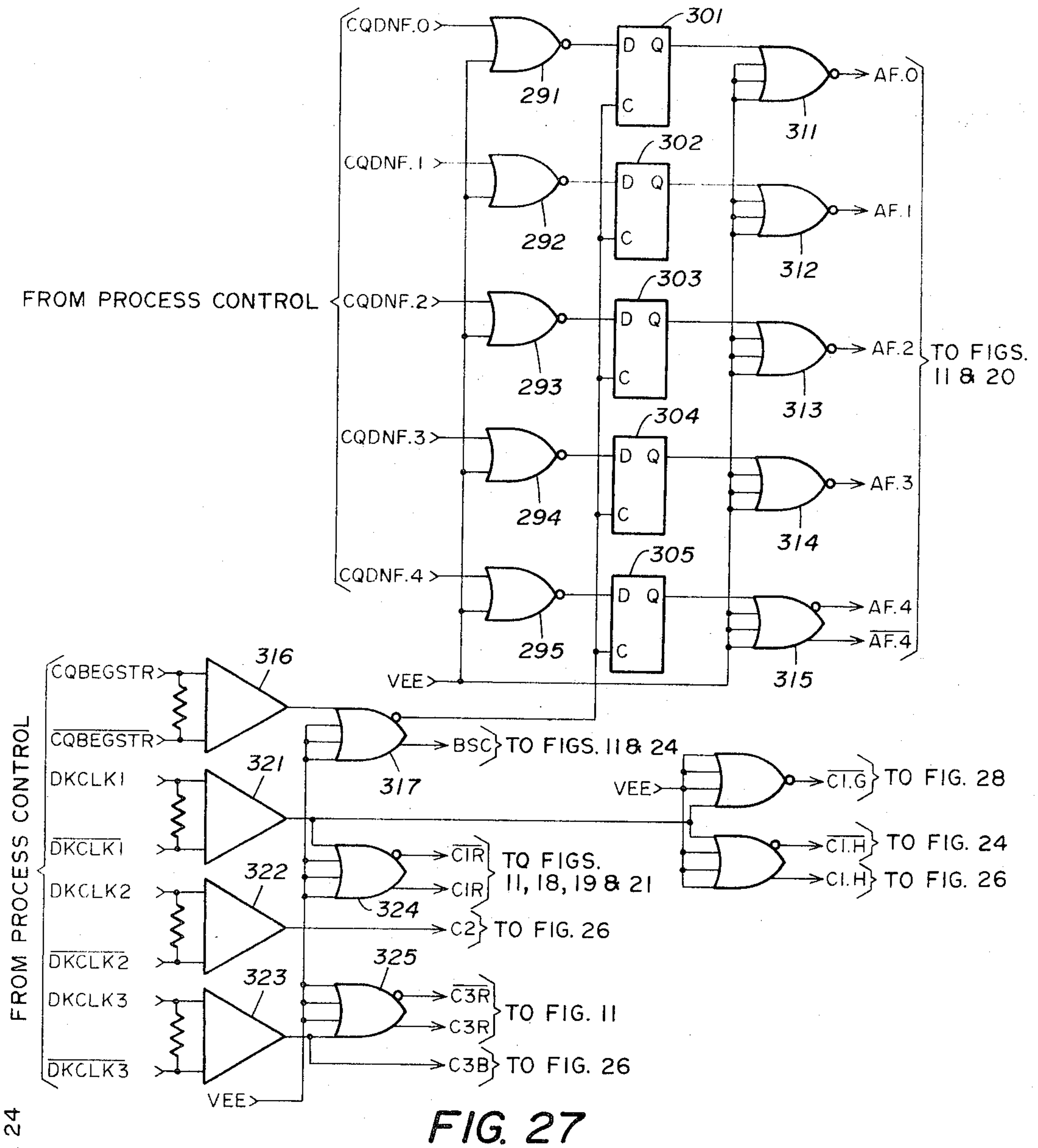
Figure 25:
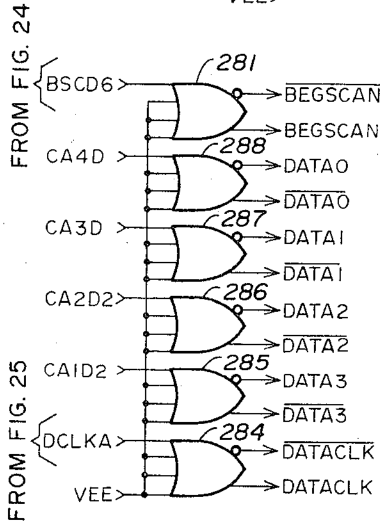

FIG. 27 is the logic for clocking the averaging factor AF and the begin scan signal BSC from the process controller into the digital averager. The normalization factor CQDNF.0 - CQDNF.4 is applied to a plurality of gates 291 – 295, through flip flops 301 – 305 and out from gates 311 – 315 to the weight tracking and divider circuitry of FIGS. 11 and 20 respectively. The begin stroke signal CQBEGSTR and its complement $\overline{\text{CQBEGSTR}}$ are applied to the input of an amplifier 316 the output of which drives a gate 317 produce the BSC signal. Data clocking signals DKCLK are input to amplifiers 321 – 323 and through gates 324 and 325 to generate circuit timing pulses.

FIG. 28 is the logic for processing the data words ADBIT for presentation to the digital averager in a timed sequence as D0-D3. Data bits ADBIT.0 - ADBIT.3 and their complements are applied through amplifiers 331 – 334 to AND gates 335 – 338 together with synchronizing pulses from gate 339. The outputs from the AND gates 335 – 338 are OR'ed together in gates 341 – 344 with test data signals SD.0 - SD.3 from gates 345 – 348 and then applied to flip flops 351 – 354. The output of the flip flops 351 – 354 is connected through gates 355 – 358 to produce the timed data signals D.0 - D3.

The document feeder and its operation are described and claimed in co-pending application, Ser. No. 159,141 filed July 2, 1971 by Alton H. Mayer and William C. Monday, assigned to the assignee of the present application.

The document stacker and its operation are described and claimed in co-pending application, Ser. No. 159,216 filed July 2, 1971 by William C. Monday, assigned to the assignee of the present application.

The document transporter and scanning system and its operation are described and claimed in co-pending application, Ser. No. 166,736, filed July 28, 1971 by Jack Edward Balko, John Edward Blair, Jerry Leon Bybee, William Francis Fuhrmeister and Richard Theodore Kushmaul, assigned to the assignee of the present application.

The recognition unit and its operation are described and claimed in co-pending application, Ser. No. 166,802 filed July 28, 1971 by William Alton Hale and Larry Paul Flaherty, assigned to the assignee of the present application.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for normalizing actual optical character recognition data into an equivalent data format representative of a preselected character size, said actual data having been produced by scanning an image having a known size of character to be recognized across a retina including a columnar array of photocells, said system comprising:
   - means for sequentially sampling the outputs from the individual photocells in said array;
   - means for digitizing said samples to form a train of data signals having a known format, each signal comprising a fixed number of signal segments;
   - means for generating a series of weighting factors based on a normalization factor representative of the ratio of said known character size to said preselected character size;
   - means for weighting individual segments of said digitized samples forming said actual data with said weighting factors, summing adjacent weighted values, and averaging said sum into an equivalent data value having the same ratio to its corresponding samples as said preselected character size has to said known character size; and
   - means for transmitting said averaged equivalent data values as a train of normalized data representative of a preselected character size to a recognition unit for analysis.

2. A method for normalizing optical character recognition data into a format representative of a preselected character size, said data having been produced by scanning an image having a known size of a character to be recognized across a retina including a columnar array of photocells, said method comprising the steps of:
   - sequentially sampling the outputs from the individual photocells in said array;
   - digitizing said samples to form a train of data having a known format indicative of the characteristics of a slice of said character image having a known size;
   - selecting a series of weighting factors in response to a normalization factor signal representative of the ratio of said known character size to said preselected character size;
   - weighting individual ones of said digitized samples forming said data train with said weighting factors summing adjacent weighted values, and averaging said sum so that the averaged value has the same ratio to its corresponding sample as said preselected character size has to said known character size; and
   - transmitting said averaged values as a train of normalized data representative of a preselected character size to a recognition unit for analysis.

3. A system for normalizing optical character recognition data into a format representative of a preselected character size, said data having been produced by scanning an image having a known size of a character to be recognized across a retina including a columnar array of photocells, said system comprising:
   - means for sequentially sampling the outputs from the individual photocells in said array,
   - means for digitizing said samples to form a train of actual cell data having a known format indicative of the characteristics of a slice of said character image having a known size,
   - means responsive to said sequential sampling means for producing a begin scan signal indicative of the start of a sampling cycle of the photocell outputs,
   - weight tracker means responsive to the begin scan signal and an averaging factor signal representative of the ratio of said known character size to said preselected character size for producing an E.C.E. signal indicative of whether the current actual cell in the train being processed contains sufficient segments to complete a corresponding current equivalent cell, a D.W. signal indicative of the number of segments of the current actual cell being processed required to construct the corresponding current equivalent cell being processed, and a T signal indicative of a number of segments of the current actual cell in the train being processed which are in excess and will be used to make the next equivalent cell to be processed,
   - multiplier means for successively forming a first product of the actual cell data and the D.W. signal and a second product of the actual cell data and the T signal,
   - means for scanning said first and second products,
   - means for dividing said sum by said averaging factor, and
   - means responsive to the presence of the E.C.E. signal from said weight tracker for successively transmitting the quotient from said divider means to a recognition unit as a train of equivalent cell data.

4. In an optical character recognition system having a retina comprising a columnar array of photocells, the size of said photocells being scaled to produce a preselected format of output actual cell data in response to the impression thereon of a character image having a preselected size, the system for producing output signals representative of equivalent cells having the same preselected format as said actual cells in response to the impression upon said retina of a character image having a known size larger than said preselected size, the system comprising:
   - means for weighting the output data from each actual cell with a factor equivalent to the quantity of a first number selected to represent the number of equal value imaginary segments of which each actual cell is to consist, the first number is used to sequentially sum segments from adjacent actual cells into adjacent equivalent cells each having a second selected number of equal value imaginary segments, the ratio of the first number to the second selected number being equal to the ratio of the preselected character size to the larger known character size, means for summing adjacent weighted segments, and means for dividing said sum by the second selected number to produce output signals representative of equivalent cells having the preselected format.

5. In an optical character recognition system having a retina comprising a columnar array of photocells, the size of said photocells being scaled to produce a preselected format of output actual cell data in response to the impression thereon of a character image having a preselected size, the method of producing output signals representative of equivalent cells having the same preselected format as said actual cells in response to the impression upon said retina of the character image having a known size larger than said preselected size, the method comprising the steps of:

weighting the output data from each actual cell with a factor equivalent to the quantity of a first number selected to represent the number of equal value imaginary segments of which each actual cell is to consist which is used to sequentially sum segments from adjacent actual cells into adjacent equivalent cells each having a second number of selected equal value imaginary segments, the ratio of the first number to the second number being equal to the ratio of the preselected character size to the larger character size, summing adjacent weighted segments, and dividing said sums by the second number to produce output signals representative of equivalent cells having a preselected format.

6. A system for normalizing actual optical character recognition data signal segments into equivalent data signal segments representative of a preselected character size, said actual data signal segments having been produced by scanning an image of a known size character to be recognized across a columnar array of photocells, the system comprising:

means for generating a series of weighting factors based on a normalization factor representative of a ratio of a known size character to a preselected character size;

means for weighting individual signal segments of said actual data with a selected weighting factor of the series;

means for combining adjacent weighted values of the actual data signal segments to obtain a series of sum signals; and means for averaging each of said sum signals into equivalent data signal segments having the same ratio of segments as the preselected character size has to the known size character.

7. A system for normalizing actual optical character recognition data as set forth in claim 6 wherein said averaging factor is determined by the number of actual data signals as related to the number of desired equivalent data signals.

8. A system for normalizing actual optical character recognition data as set forth in claim 6 wherein said actual data is produced by means for sequentially sampling the outputs from the individual photocells in said array; and means for digitizing said sample to form a train of data signals having a known format, each signal comprising a fixed number of signal segments.

* * * * *

PO-1050
(5/69)

UNITED STATES PATENT OFFICE
CERTIFICATE OF CORRECTION

Patent No. 3,784,981 Dated Jan. 8, 1974

Inventor(s) Chester Joseph Borowski, Jr. and Dale Rodney DuVall

It is certified that error appears in the above-identified patent and that said Letters Patent are hereby corrected as shown below:

Col. 2, lines 39 and 40, "exclusing" should be --excluding--.
Col. 3, line 25, "minutes" should be --minute--;
line 44, "schematically" should be --mechanically--;
line 60, "50" should be --20--;
line 61, "51" should be --21--;
line 61, "52" should be --22--;
line 62, "53" should be --23--;
line 63, "50" should be --20--;
line 64, "54" should be --24--;
line 65, "55" should be --25--;
line 65, "56" should be --26--;
line 66, "50" should be --20--.
Col. 4, line 2, "50" should be --20--;
line 3, "59" should be --29--;
line 6, "62" should be --42--;
line 6, "63" should be --43--;
line 7, "64" should be --44--;
line 8, "64" should be --44--;
line 9, "65" should be --45--;
line 9, "66" should be --46--;
line 10, "67" should be --47--;
line 10, "68" should be --27--;
line 11, "65" should be --45--;
line 12, "65" should be --45--;
line 13, "64" should be --44--;
line 21, cancel "line" (first occurrence);
line 23, "51" should be --21--;
line 23, "52" should be --22--;
line 33, "81" should be --73--;
line 33, "82" should be --74--;
line 33, "83" should be --75--;
line 38, "86" should be --76--;
line 38, "88a" should be --78a--;
line 38, "88b" should be --78b--;
line 39, "88c" should be --78c--;
line 45, "88a-c" should be --78a-c--;

PO-1050
(5/69)

UNITED STATES PATENT OFFICE
CERTIFICATE OF CORRECTION

Patent No. 3,784,981 Dated Jan. 8, 1974

Inventor(s) Chester Joseph Borowski, Jr. and Dale Rodney DuVall

It is certified that error appears in the above-identified patent and that said Letters Patent are hereby corrected as shown below:

ol. 4, line 56, "89" should be --79--;
line 58, "86" should be --76--;
line 66, "86" should be --76--.
ol. 6, line 34, "retina" (first occurrence) should be --array--;
line 34, "Retina" (second occurrence) should be --Array--;
line 38, "are" should be --were--.
ol. 7, line 4, "Z" should be --amplifier 21--;
line 5, after "while" insert --amplifier--;
line 6, "Z" should be --2--;
line 19, "retina" should be --video--;
line 23, "retina" should be --video--;
line 67, cancel "2:1".
ol. 8, line 53, "retina" should be --array--;
line 55, "created" should be --determined--.
ol. 9, line 5, "retina" should be --array--;
line 6, "72" should be --2--;
line 6, "73" should be --3--;
line 6, "retina" should be --array--;
line 8, "71" should be --1--;
line 9, "retina" should be --array--;
line 9, "71-73" should be --1-3--;
line 11, "74a" should be --4a--;
line 11, "74" should be --4--;
line 27, "retina" should be --array--;
line 47 and 48, "retina" should be --array--.
ol. 11, line 43, "averagee" should be --averager--.
ol. 18, line 10 "xx00111" should be --xx00111--.
ol. 20, line 5, "SC" should be --SD--.

Signed and sealed this 9th day of July 1974.

SEAL)
ttest:

cCOY M.GIBSON,JR.
ttesting Officer

C. MARSHALL DANN
Commissioner of Patents